United States Patent [19]
Rusek et al.

[11] Patent Number: 4,781,988
[45] Date of Patent: Nov. 1, 1988

[54] CORROSION-RESISTANT COATING

[75] Inventors: John J. Rusek; Dick L. Tomlinson, both of Newark, Ohio

[73] Assignee: Owens-Corning Fiberglas Corporation, Toledo, Ohio

[21] Appl. No.: 912,862

[22] Filed: Sep. 29, 1986

[51] Int. Cl.$^4$ ............................................. B32B 15/08
[52] U.S. Cl. .................................. 428/450; 428/425.8; 428/457; 428/458; 428/462; 428/463; 428/468; 428/704
[58] Field of Search ................. 524/96; 428/457, 463, 428/468, 425.8, 450, 458, 462; 106/14.31, 14.34, 14.37

[56] References Cited

U.S. PATENT DOCUMENTS

| | | | |
|---|---|---|---|
| 1,995,954 | 3/1935 | Albrecht | 134/26 |
| 2,328,540 | 7/1943 | Hochwalt | 252/49.5 |
| 2,349,338 | 5/1944 | Clapsadle et al. | 252/75 |
| 2,588,441 | 3/1952 | Watkins | 106/14 |
| 2,677,618 | 5/1954 | Deiman et al. | 106/14 |
| 2,692,840 | 10/1954 | Bell | 148/6.16 |
| 2,701,238 | 2/1955 | Renold | 252/192 |
| 2,914,424 | 11/1959 | Murray | 117/106 |
| 2,995,532 | 8/1961 | Cantrell et al. | 260/19 |
| 3,036,934 | 5/1962 | Horton et al. | 117/132 |
| 3,310,417 | 3/1967 | Lerner et al. | 106/287 |
| 3,313,650 | 4/1967 | Raeuber et al. | 117/127 |
| 3,416,974 | 12/1968 | Scott | 148/6.15 |
| 3,447,891 | 6/1969 | Crawford | 21/2.5 |
| 3,574,652 | 4/1971 | Alexander et al. | 106/278 |
| 3,649,167 | 3/1972 | Sawyer | 21/2.5 |
| 3,661,796 | 5/1972 | Erby et al. | 252/392 |
| 3,989,640 | 11/1976 | Culver et al. | 252/364 |
| 4,002,583 | 1/1977 | Taylor et al. | 260/17 |
| 4,392,972 | 7/1983 | Mohr et al. | 252/75 |

OTHER PUBLICATIONS

"Noverox Rust Eliminator" Faultless Starch/Bon Ami Company 1983.
"Extend Rust Treatment" Loctite Corporation, Jun. 1984.
"Product Data Sheet, Extend Rust Treatment" Loctite Corp., 2/84.
"Fertan–A Solution to Rust" Fertan International, Inc., 8/23/84.
"Fundamentals of Acrylic Polymers" Reprint from Jul. 1973 issue of *Paint and Varnish Production*.
"ASTM Specification G5-71" pp. 1047–1056 (1971).
"ASTM Specification G15-71" pp. 1057, 1058 (1971).

*Primary Examiner*—Theodore E. Pertilla
*Attorney, Agent, or Firm*—Patrick P. Pacella; Robert F. Rywalski

[57] ABSTRACT

A corrosion-resistant coating for a ferrous surface comprising an asphaltic matrix of an asphalt or a petroleum resin or a mixture thereof having a convertant dispersed therein. The convertant is either adsorbed at the ferrous surface or reacts chemically with the surface to prevent further oxidation. Preferably, the coating is sprayed onto the surface as a solution in a solvent, and the solution may also include a film-forming resin. Other optional coating ingredients include elastomers to improve low-temperature characteristics, and fillers or bulking agents.

11 Claims, 20 Drawing Sheets

CORROSION-RESISTANT COATING

TECHNICAL FIELD

The present invention proposes a corrosion-resistant coating for ferrous surfaces, such as a steel surface which is either pristine or rusted, comprising a coating matrix, a convertant dispersed in the matrix and capable of preventing further oxidation of the surface, and, where the matrix is porous, a film-forming polymeric material sealing the matrix-convertant combination against moisture and forming a flexible composite coating. The coating composition is applied, preferably by spraying, from a liquid coating composition in which all of the coating ingredients are dispersed in a common fugitive solvent. The convertant is capable of physical or chemical adsorption to the ferrous surface or of chemically reacting with the ferrous surface to prevent further oxidation.

BACKGROUND AND SUMMARY OF THE INVENTION

Various corrosion-resistant coatings for ferrous surfaces have been proposed in the prior art, and several such compositions are commercially available which are purported to prevent oxidation of said surfaces.

A first such commercial coating is a water-based resin emulsion containing a synthetic latex resin, an organic acid and propylene glycol in water applied as a nominal 2.5 mil dry film. A second such material is a low-viscosity chelating polymer apparently disclosed in U.S. Pat. No. 3,753,924. This material contains tannins, a chelation catalyst such as oxalic acid, and a cross-linking agent, such as formaldehyde. A third such commercial coating material apparently is disclosed in U.S. Pat. No. 4,086,182. According to the patent disclosure, this coating contains a synthetic binding agent which is a polymeric esterification product of an aromatic oxycarboxylic acid having phenolic hydroxyl groups, such as an ester of gallic acid or tannin with an acid anhydride.

Other conventional, commercially available corrosion-resistant coatings for ferrous surfaces include (1) oil-based red lead primers, (2) zinc chromate-based alkyd primers, (3) inorganic zinc-rich primers, (4) organic zinc-rich primers, (5) aluminized epoxy mastics, and (6) coal tar mastics.

Each of these commercially-available products, including the three above set forth in detail, serves essentially as a primer or an undercoat to which a later paint layer is applied, and these products do prevent rusting of an underlying ferrous surface so long as the coating remains in place and is undisturbed. However, once the coating is cut or chipped and the underlying ferrous surface is exposed, the underlying exposed ferrous surface rusts in a spreading pattern which undercuts the coating, so that rusting proceeds beneath the coating and the coating soon flakes and falls off the ferrous surface. This phenomenon of "undercutting" of the coating means that the coating cannot be utilized effectively to protect a ferrous surface under many different environments where the coating is subject to impact or abrasion, for example, such coatings are not useful as an undercoating for automobiles where the coating is subject to impact from stones or gravel or other foreign objects on a roadway.

The present invention now proposes a new and improved corrosion-resistant coating which not only protects the ferrous surface while the coating remains in place, but also prevents undercutting of the coating when the coating is cut, chipped, or otherwise removed from the ferrous surface. There is some evidence that the coating will also prevent oxidation of that portion of the substrate which is exposed when the coating is cut down to the metal.

While the mechanism of protection by the coating of the present invention is not fully understood at the present time, it has been found that the active ingredient or "convertant" of the corrosion-resistant coating of the present invention is attached to the ferrous surface to prevent further oxidation of the surface. In one specie of convertant, for example where the convertant is morpholine, the surface attachment is by physical or chemical adsorption to the surface. In another specie of the present invention, for example where the convertant is trimethyl phosphite, the attachment is by chemical reaction with the ferrous surface. Further, at least in the case of morpholine, the diffusion of the convertant through the coating matrix ensures the presence of adequate morpholine at the ferrous surface, and the morpholine may migrate into a narrow crack or cut in the coating to inhibit rusting of the substrate.

Thus, the convertant of the present invention prevents oxidation of a ferrous surface or prevents further oxidation of a rusted iron surface in a manner which is quite different from the manner in which the prior art compositions function.

The convertant of the present invention is preferably applied to the ferrous surface as a part of a coating composition which includes the convertant itself, a matrix ingredient for retaining the convertant on the surface, and a solvent in which both the matrix ingredient and the convertant are dissolved so that the coating can be applied, preferably by spraying. Where the coating is porous, such as an asphaltic coating, the coating composition also preferably includes a film-forming ingredient which serves to seal the matrix, so that a water-soluble convertant will not be dissolved or leached from the composition by water, and the film former also serves to improve the physical characteristics of the matrix.

For some uses of the coatings of the type hereinbefore set forth, the coating may also include an elastomer or rubber, such as polyisobutylene or a block copolymer of styrene and butadiene, to impart desirable low temperature flexing properties to the coating. Various fillers, such as finely-divided calcium carbonate, or various bulking agents, such as a solvent-swellable kaolin clay or fumed silica, can be added to the composition.

DETAILED DESCRIPTION OF THE INVENTION

Figure 1:
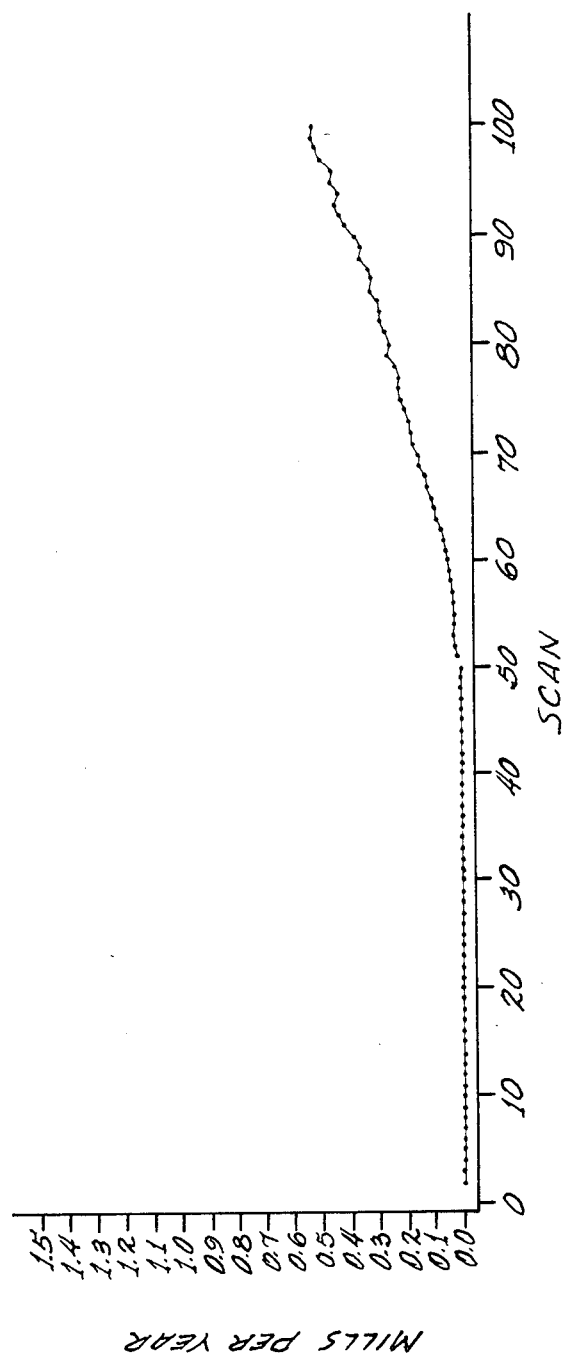
FIGS. 1–17 are charts generated by direct current testing of various non-convertant controls and convertant-containing corrosion-resistant coatings of the present invention applied to ferrous substrates and tested by a modification of ASTM Standard Method G5-71.

As above explained, the corrosion-resistant coating of the present invention incorporates as its active ingredient a convertant, and this term as used herein refers to those compounds which either (1) are capable of physical or chemical adsorption to a ferrous surface or (2) are capable of chemical reaction with a ferrous surface to prevent, in either case, further oxidation of the ferrous surface. Generally, such convertants are of relatively low molecular weight. Typically, such convertants are of two classes, namely (1) morpholine, which is exemplary of convertants which protect the ferrous surface by adsorption, and (2) spherically symmetric alkyl esters, e.g., trimethylphosphite, trimethylborate and tetramethylorthosilicate, which are exemplary of chemically reactive convertants. Generally, the symmetric $C_1$ to $C_5$ alkyl (preferably methyl) esters of phosphorous, silicon, and boron can be utilized and such alkyl esters are "spherically symmetric" in the sense that the alkyl ester groups are symmetrically arranged about a central metal atom.

The spherically symmetric esters of the present invention are of the type $M(OR)_y$ where M is phosphorus, boron, or silicon, R is a one to five carbon alkyl, and y is an integer corresponding to the valence state of M.

The convertants are effective to "passivate" the surface of the ferrous article to which the coating has been applied, and the mechanism by which this is accomplished depends upon the specific convertant which is utilized. Where the convertant is morpholine, it has been demonstrated that the morpholine is bound to the ferrous surface by adsorption, thereby preventing oxidation of an iron surface or preventing further oxidation of a surface which had been rusted to iron oxide. Where the convertant is a spherically symmetric alkyl ester, it appears that the convertant chemically reacts with the ferrous surface to prevent further oxidation.

The matrix of the present invention may be any suitable material for retaining the convertant in contact with the ferrous article to be protected. Suitable matrices include asphalts, petroleum resins, alkyd resins, urethane resins, polyester resins, alkyl methacrylate resins, and the like.

Generally, primarily for economic reasons, the preferred matrices include asphalts and petroleum resins.

One type of preferred asphalt is a solvent-precipitated asphalt, such asphalts commonly being known as "propane-washed asphalts," such asphalts being available to the trade under the designations "Monar," "Cenex" and "Atlas." Such asphalts typically have low penetration, for example, on the order 0 to 10, and softening points on the order of 100 to 150° F. Other asphalts which can be utilized include paving grade asphalts, e.g., AC-10 asphalt, blown or polymerized asphalts, and the like materials.

A second class of preferred matrices are those designated as "petroleum resins" having penetrations ranging from about 30 to about 45 and softening points of from about 110 to about 125° F. A typical such resin is sold by Borcke Associates, Inc., Great Neck, New York, as Borcke 3150 resin.

A typical propane-washed asphalt contains about 20% asphaltenes, about 6% maltenes and about 74% resins. Borcke 3150 asphalt contains about 25% maltenes and about 75% resins; and is derived from original crude oil stock which is very low in asphaltenes. More generally, the asphalts preferred in the present invention are those which are low in oxygen and/or hydroxyl group content, and those asphalts which contain minimal polar constituents. Thus, blown asphalts and common paving grade asphalts generally are less preferred, but may be used in the present invention.

The convertants generally are low in molecular weight and at least one convertant, i.e., morpholine, diffuses through an asphaltic matrix or a synthetic resin matrix to the ferrous surface. These matrices containing the convertant on the ferrous surface are quite porous, and, in the presence of moisture, the convertant may be leached out of the asphalt. Also, a layer of asphalt alone may become brittle upon evaporation of the solvent and upon exposure to an oxidizing atmosphere. The addition of a petroleum resin to an asphaltic matrix aids in reducing the brittleness of the coating, because the petroleum resin does not dry out and become as brittle as the asphalt. The most preferred composition includes a mixture of propane-washed asphalt and petroleum resin as the matrix and morpholine as the convertant.

To further improve the physical characteristics of a matrix of asphalt or petroleum resin or a mixture of the two, it is preferred that a compatible film-forming synthetic resin be added to the matrix. Preferred synthetic film makers for addition to the matrix include acrylic resins of the type disclosed in an article by William H. Brendley, Jr. in the July 1973 issue of *Paint and Varnish Production* entitled "Fundamentals of Acrylic Polymers."

Specific acrylic polymers which can be utilized include alkyl methacrylate copolymers or alkyl acrylate polymers and copolymers, such as a methyl/butyl methacrylate copolymer sold by Rohm & Haas of Philadelphia, Pa. under the trade designation "Acryloid B-66," and an ethyl methacrylate copolymer also available from Rohm & Haas under the trade designation "Acryloid B-72." Preferably, the alkyl group is a $C_1$ to $C_4$ alkyl. Such thermoplastic acrylic resins as the methyl/butyl methacrylate copolymer and the ethyl methacrylate copolymer above identified are compatible with both the convertant and the asphalt or asphalt-petroleum resin matrices and may be incorporated into the coating of the present invention by application to the surface from a coating composition in which the coating ingredient are dispersed, along with the matrix ingredients and the convertant, in a common solvent.

It has been found that the methyl/butyl methacrylate copolymer is particularly advantageous when utilized in a coating containing morpholine as a convertant. The ethyl methacrylate copolymer appears to be less compatible with coatings containing morpholine. The ethyl methacrylate copolymer is particularly desirable when utilized with a spherically symmetric alkyl ester, such as trimethylphosphite. Although the methyl-butyl methacrylate is compatible with trimethyl phosphite, it results in a coating which is less corrosion-resistant than the coating containing the ethyl methacrylate copolymer. The effect of the film-forming acrylic resin is to (1) make the basic matrix more flexible, and (2) to waterproof the basic matrix to prevent leaching of the convertant from the matrix when the coating is exposed to moisture.

The coating is preferably applied to the ferrous surface by spraying a solution of the basic matrix and the convertant, plus a film-forming resin if utilized, in a common solvent. Suitable solvents include those liquids which disperse the matrix component, the convertant, and any film former which might be utilized, so long as the solvent is sufficiently volatile to yield a solid, solvent-free coating on the ferrous surface within a reasonable drying time. The preferred solvents have a vapor pressure which is the same or higher than about that of cyclohexanone (136 mm at 100° C.) and a boiling point which is the same or less than about that of cyclohexanone (156.7° C.).

Suitable solvents include (1) relatively low molecular weight aromatic hydrocarbons, e.g., toluene, xylene, and isopropylbenzene (cumene); (2) volatile esters, e.g., butyl acetate and ethyl acetate; (3) glycol ethers; (4) ketones, e.g., acetophenone and cyclohexanone; (5) aliphatics, e.g., hexane and heptane; and (6) Rule 66 mineral spirits; or mixtures of such solvents. Some solvents are more effective with alkyl esters than with morpholine, e.g., Tetralin (tetrahydronaphthalene). Of course, it is desirable to use environmentally acceptable solvents having vapor pressures adaptable to film spraying operations without excessive drying times.

Suitable glycol ethers are available from Dow Chemical Company, Midland, Mich., under the tradename "DOWANOL." Exemplary ethers include propylene glycol methyl ether (Dowanol PM); dipropylene glycol methyl ether (Dowanol DPM); ethylene glycol n-butyl ether (Dowanol EB); diethylene glycol methyl ether (Dowanol DM); and diethylene glycol ethyl ether (Dowanol DE). The glycol ethers also serve as film initiators which lay down an even film, and mixtures of one or more glycol ethers with other solvents, such as n-butyl acetate, are particularly preferred.

The solvent is essentially fugitive, i.e., it serves solely as a solvent for the film ingredients, it evaporates from the sprayed film, and it is not present in the final coating.

So far as the range of ingredients in the coating of the present invention is concerned, the dry coating preferably contains from about 1% to about 15% by weight convertant, most preferably from about 6% to about 10% by weight; from about 1% to about 15% by weight acrylic resin, if utilized, most preferably from about 3% to about 8% by weight; and the balance is the matrix component.

The coating solution preferably contains from about 40% to about 60% by weight solvent. Most preferably, the coating solution contains approximately equal amounts of matrix and solvent ingredients.

Using the solvent and in a spray coating, the final composition viscosity preferably is adjusted to a viscosity of from about 150 to about 200 centipoises at room temperature as determined by the use of a No. 5 spindle at 20–100 rpm. The "solids" content, i.e., the dry coating ingredient content, preferably is adjusted to be from about 40% to about 60% by weight, and most preferably from about 47% to about 53% by weight, of the coating solution.

Various other ingredients can be added to the composition without affecting or altering the essential corrosion-resistant character of the composition. For example, various fillers such as finely divided calcium carbonate, sand and the like can be added, as well as various bulking agents such as kaolin clay, fumed silica and the like. The amounts of such fillers or bulking agents to be added will be dependent upon the type of final coating which is desired and upon the economics of the final coating. For example, as much as 60% of kaolin clay as a bulking agent can be added, if desired, to decrease the bulk density and to increase the volume of the coating by as much as a factor of 3 or 4.

Other ingredients which affect the physical properties of the coating without affecting its corrosion-resistant characteristics can also be added. For example, an llastomer can be added to the coating in order to improve its low-temperature flexural characteristics. Such elastomers may include block copolymers of styrene and butadiene or of styrene and isoprene, for example, linear block copolymers of styrene-butadiene-styrene, e.g., Kraton 1101 (available from Shell Chemical Co) or Finaprene 1205 (available from Petrofina S. A., Brussels, Belgium); radial block copolymers of styrene and butadiene, e.g., Finaprene 416 block copolymer; or other types of natural or synthetic rubbers, including reclaimed or devulcanized rubber, can also be added, as well as rubbery elastomers, for example, polyisobutylene. As a specific example, it has been found that the addition of as little as 1% of a linear styrene-butadiene-styrene block copolymer (Finaprene 1205) yielded a coating which passed the ASTM Standard Low Temperature Flex Test at −20° F.

Generally, such rubber ingredients may be added in any amount less than that which would interfere with the spray application of the coating, and generally from about 0.5% to about 5% by weight, and preferably from about 1% to about 3%, elastomer may be incorporated into the coating, if desired.

A composition particularly adapted for automobile undercoatings and the like is as follows:

| Ingredient | % by Weight Broad | % by Weight Preferred |
| --- | --- | --- |
| Solvent Extracted Asphalt | 20–45 | 20–45 |
| Petroleum Resin | 0–40 | 0–30 |
| Convertant | 1–15 | 6–10 |
| Film Forming Polymer | 0–15 | 3–8 |
| Solvent | 40–60 | 47–53 |
| Glycol Ether | 0–5 | 0–3 |
| Elastomer | 0–5 | 0–3 |

A single specific composition of this type, exemplified by the composition of Example II hereinafter disclosed, may contain approximately equal portions of propane-washed asphalt and Borcke 3150 resin as a matrix, about 7% morpholine as the convertant, about 3.5% methyl butyl methacrylate copolymer, an amount of n-butyl acetate approximately equal to the combined matrix ingredients and about 2% glycol ether. Kaolin clay may be added as a bulking agent, and about 1% of a block copolymer of styrene and butadiene can also be added to improve the low temperature characteristics.

Preferably, when applied from a coating solution of matrix, convertant and film-forming constituent in a common solvent, the coating has a thickness of from about 0.5 mil to about 6 mils (0.0005 to 0.006 inches) and most preferably a thickness of about 0.7 mil (0.0007 inch) to about 1.5 mil (0.0015 inches) on a dry film basis, i.e., after evaporation of the solvent. Greater thicknesses can be utilized, if desired, but the greater thickness generally does not add appreciably to the corrosion resistance of the coating.

It has been found that coatings of a thickness up to about 6 mils are more ductile and flexible than thicker coatings. However, the coating thickness can be increased without an appreciable loss of ductility and flexibility by the addition of bulking agents, such as kaolin clay. It has been found that the addition of about 34 parts by weight kaolin clay to about 40 parts by weight of the coating solution decreases the bulk density and increases the coating volume by a factor of 3, and such a coating can be applied at thicknesses of about 6 to about 10 mils, while remaining sufficiently ductile and flexible.

EXAMPLE I

Coating samples were prepared according to the compositions shown on FIGS. 1–17 of the drawings. Generally, these samples were prepared by dissolving the asphaltic component and 8% of the defined convertant, plus 6% of the film-forming resin, if present, in the defined solvent. The resultant coating solution was sprayed on a toluene-washed and p-xylene ultrasound cleaned electrode disc (1020 steel, 600 grit finish, from Metal Samples, Inc.) to obtain a coating of the defined thickness. The samples were then tested in accordance with ASTM Standard G5-71 testing procedure modified in the following manner:

(1) The potential range was from −250 mv relative to the corrosion potential ($E_{corr}$.) to +1500 mV relative to a calomel electrode.
(2) The potential sweep rate was 2 mV per second.
(3) The electrolyte was 0.001 N NaCl with bubbling oxygen (about 4%) passed through the electrolyte with constant stirring and at ambient temperature.
(4) Each sample was 1-square centimeter in size on a circular disc of 1020 carbon steel plate, polished to 600 and cleaned with p-xylene. The coating to be tested was spray-applied and its thickness was measured.
(5) Each sample was subjected to an initial 50 sequential scans over the potential range. The sample was then removed, two scribes down to the metal surface were applied in an "X" shape, approximately 90° relative to one another and spanning the disc. The scribed sample was then subjected to another series of 50 sequential scans.
(6) The readout is in the form of a plot of each scan in sequence against corrosion rate in terms of mils per year. The average corrosion rate in MPY for the first 50 scans and the second 50 scans was then determined.

The graphs of FIGS. 1–17 illusrrate the corrosion rates of the samples, expressed as mils per year or MPY, plotted against the successive scans in sequence.

FIG. 1 illustrates the expected DC testing pattern of a non-convertant coating. The coating remained in place during scans 1–50 and provided protection. When cut, as in scans 51–100, the coating was interrupted and the progressive increase in corrosion, measured in "mils per year" increased steadily.

Figure 2:
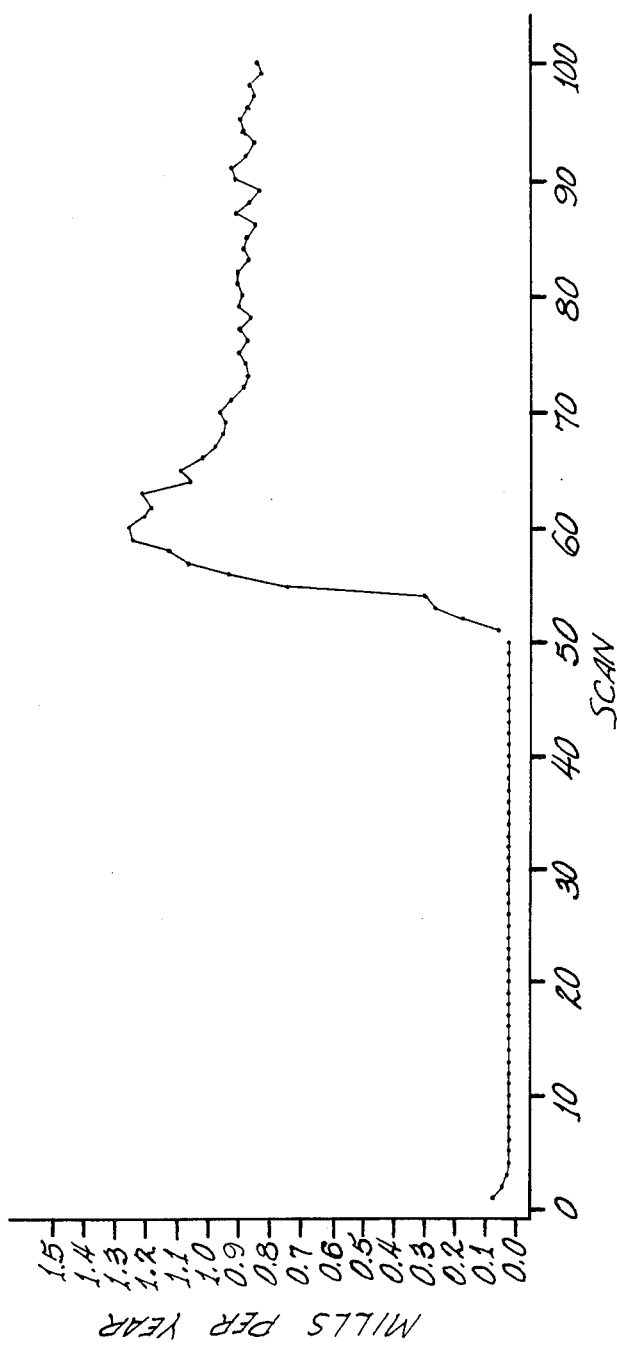
Figure 3:
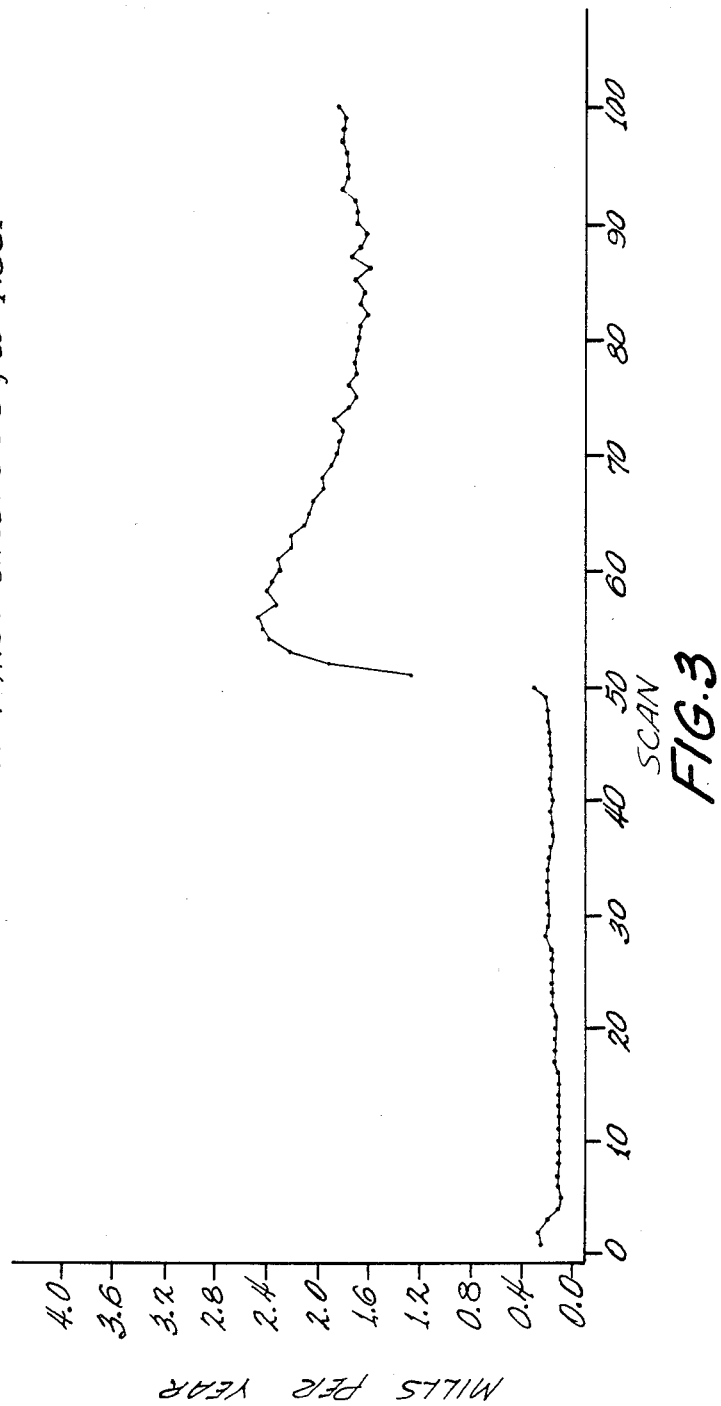

FIGS. 2 and 3 show a different pattern, but the substantially higher, post-cut rates can be observed.

Figure 4:
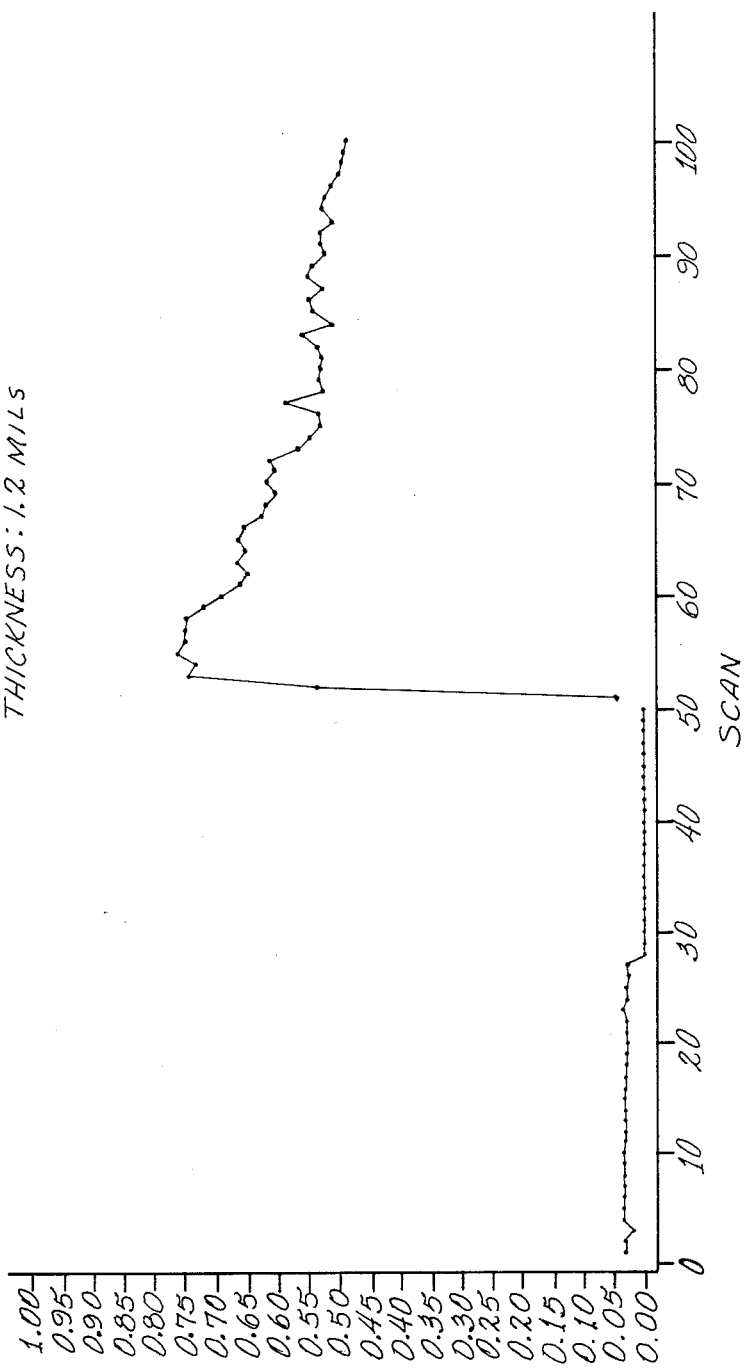
Figure 5:
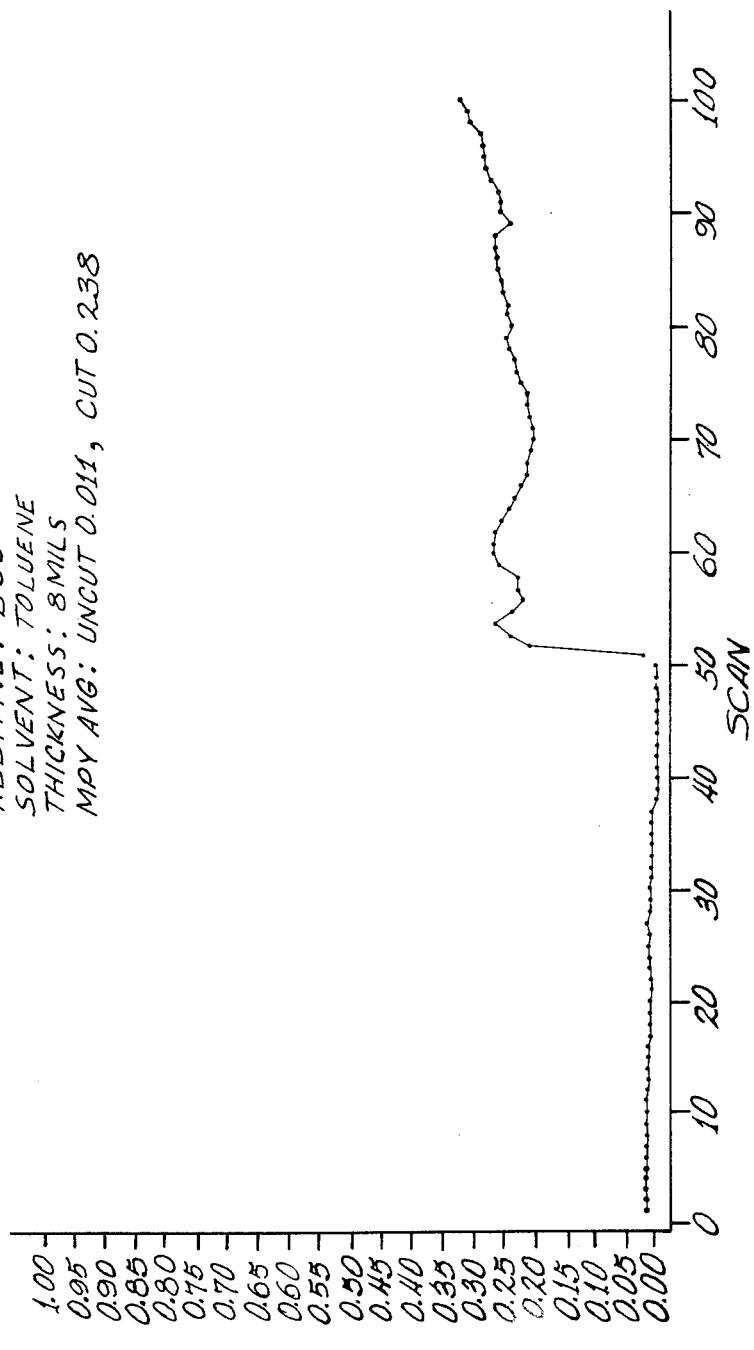
Figure 6:
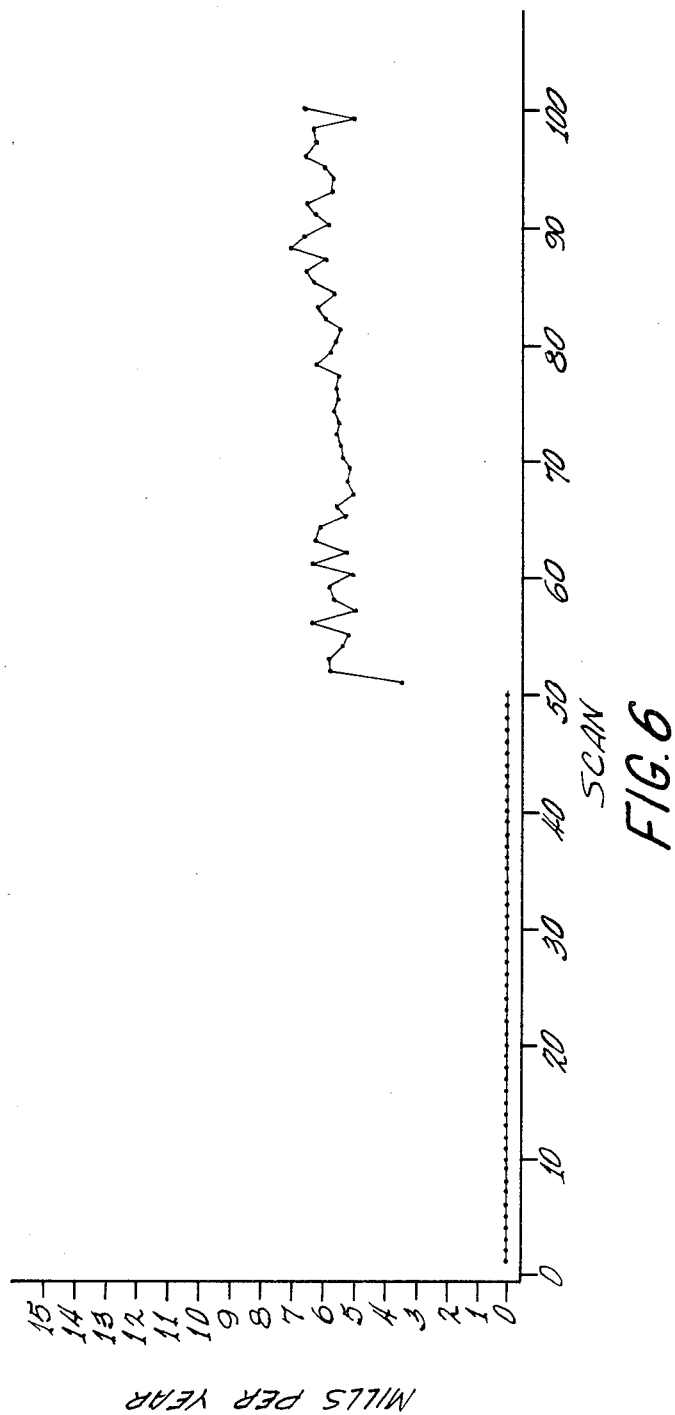
Figure 7:
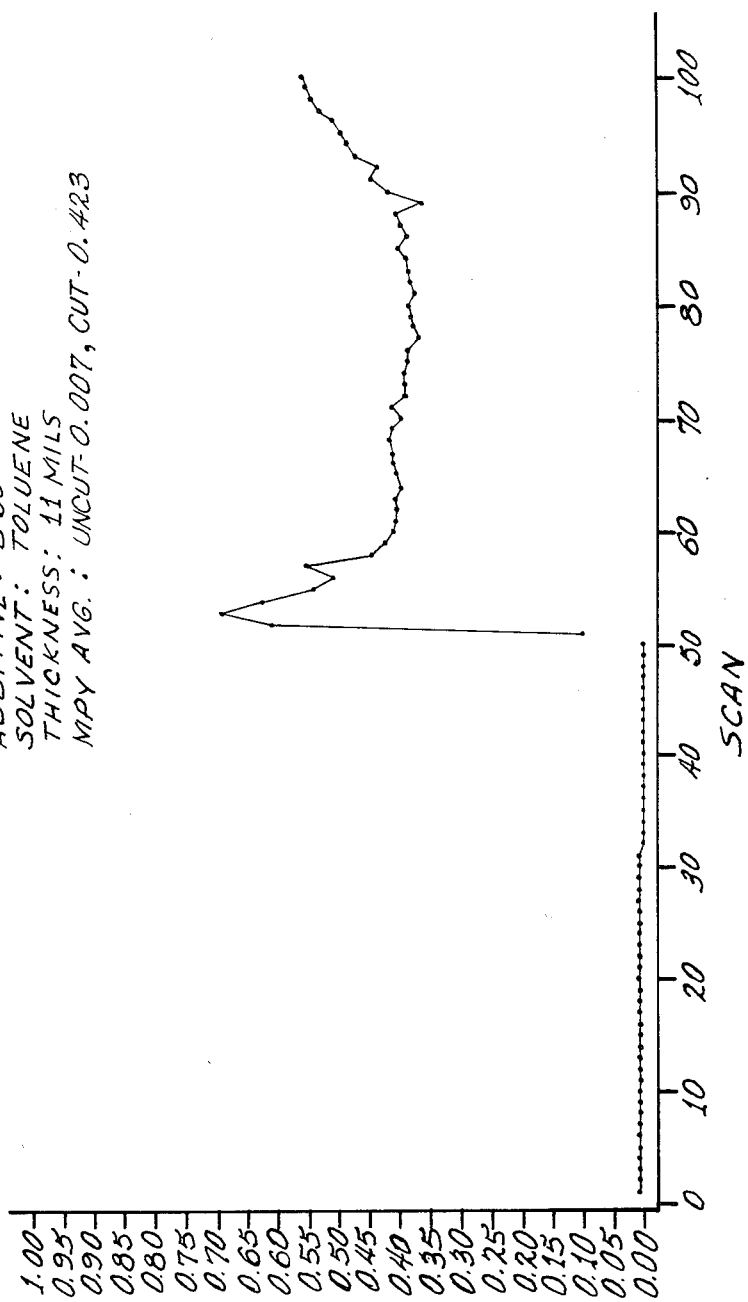
Figure 8:
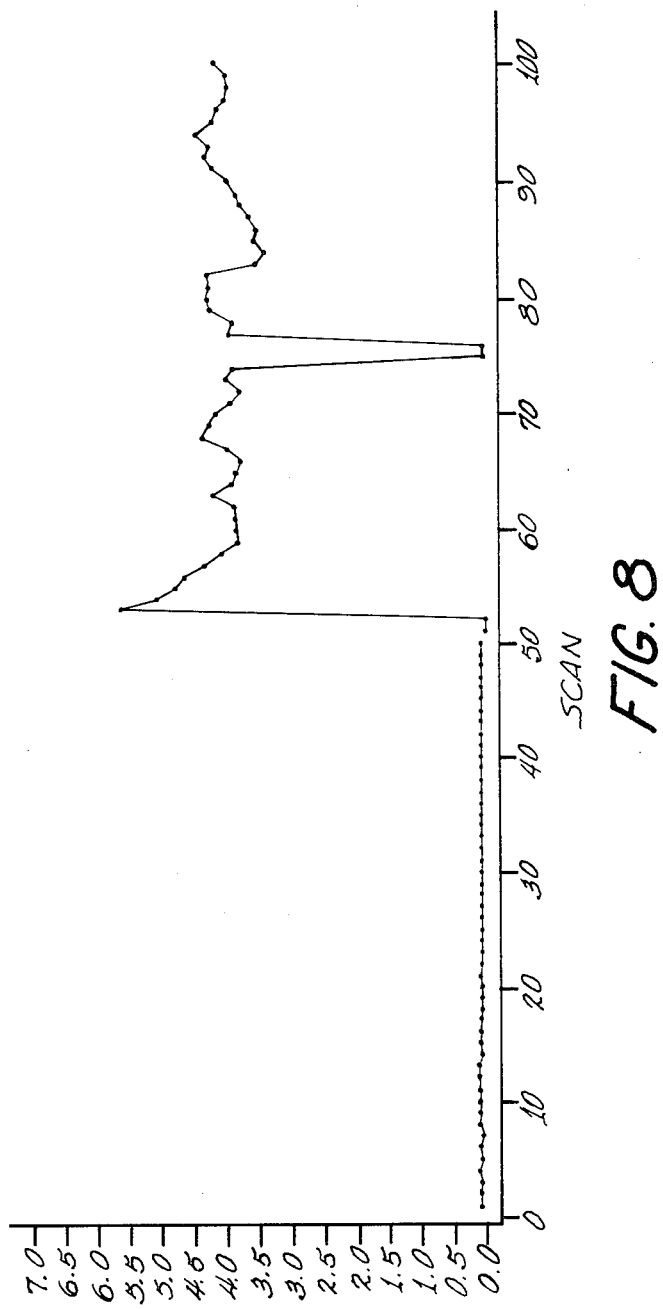
Figure 9:
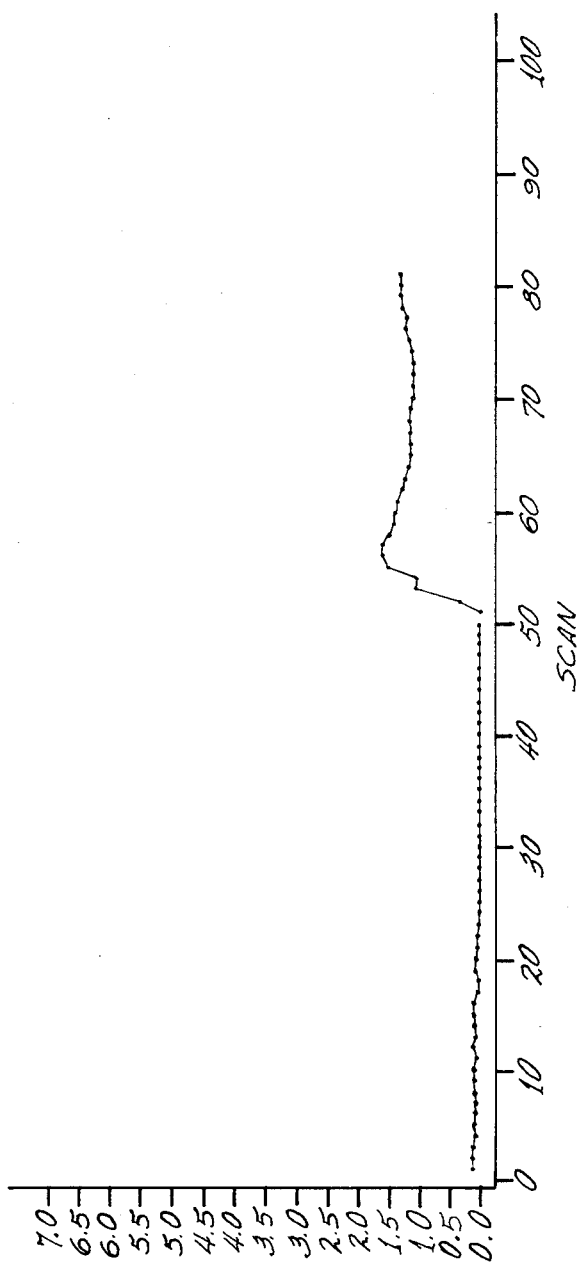

FIG. 4 shows the effect of morpholine as a convertant in the asphalt of FIG. 1. The steadily diminishing corrosion value, following an initial "spike," and the low average corrosion, on the order of 0.55 mils per year, shows the value of morpholine. FIGS. 5–9 show generally similar characteristics.

Figure 10:
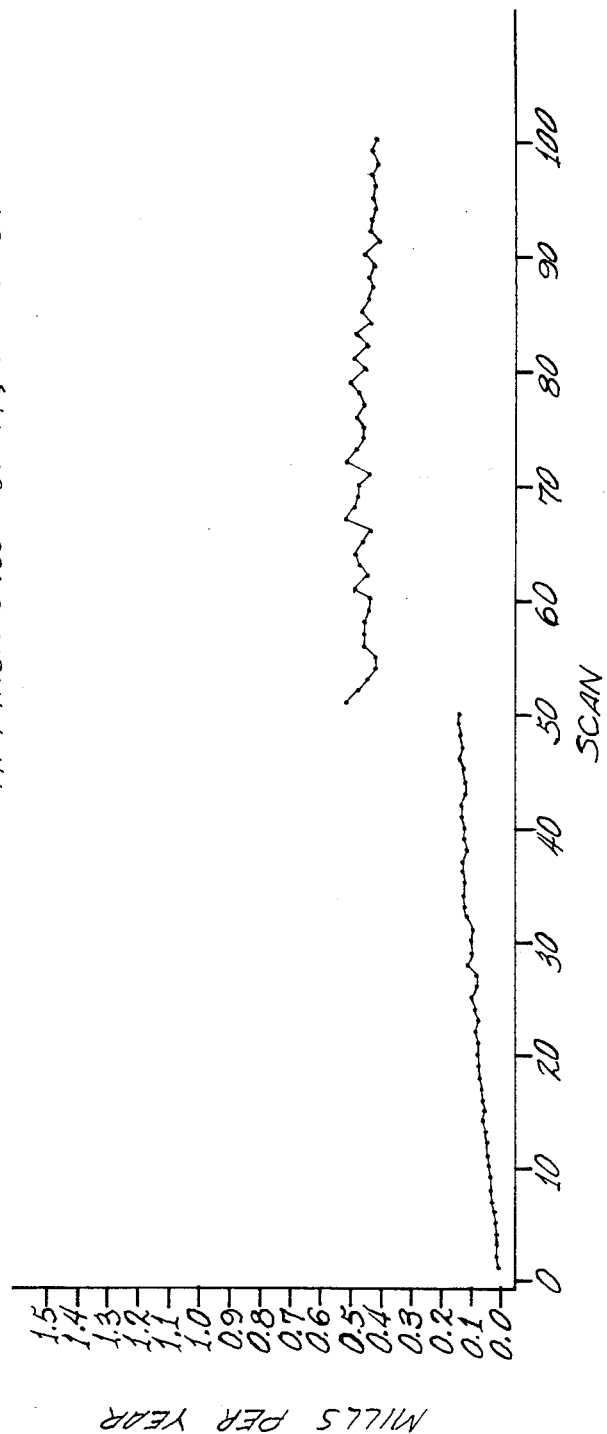
Figure 11:
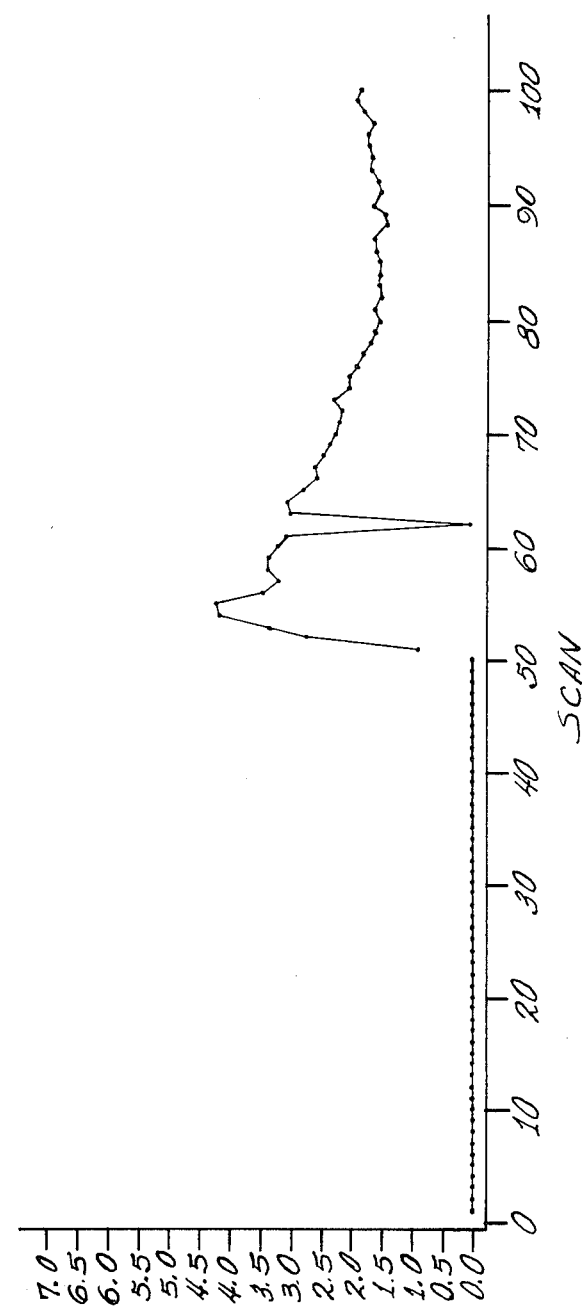
Figure 12:
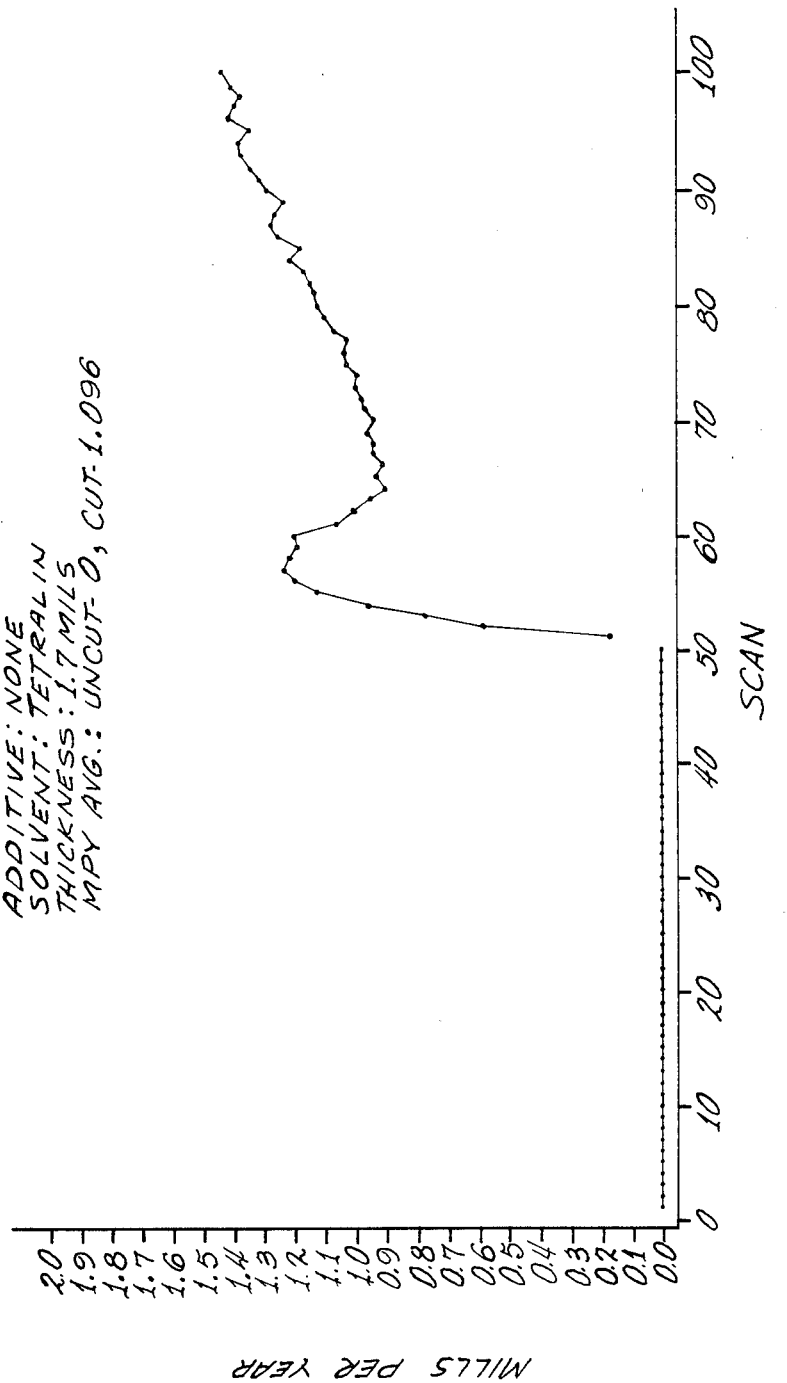
Figure 13:
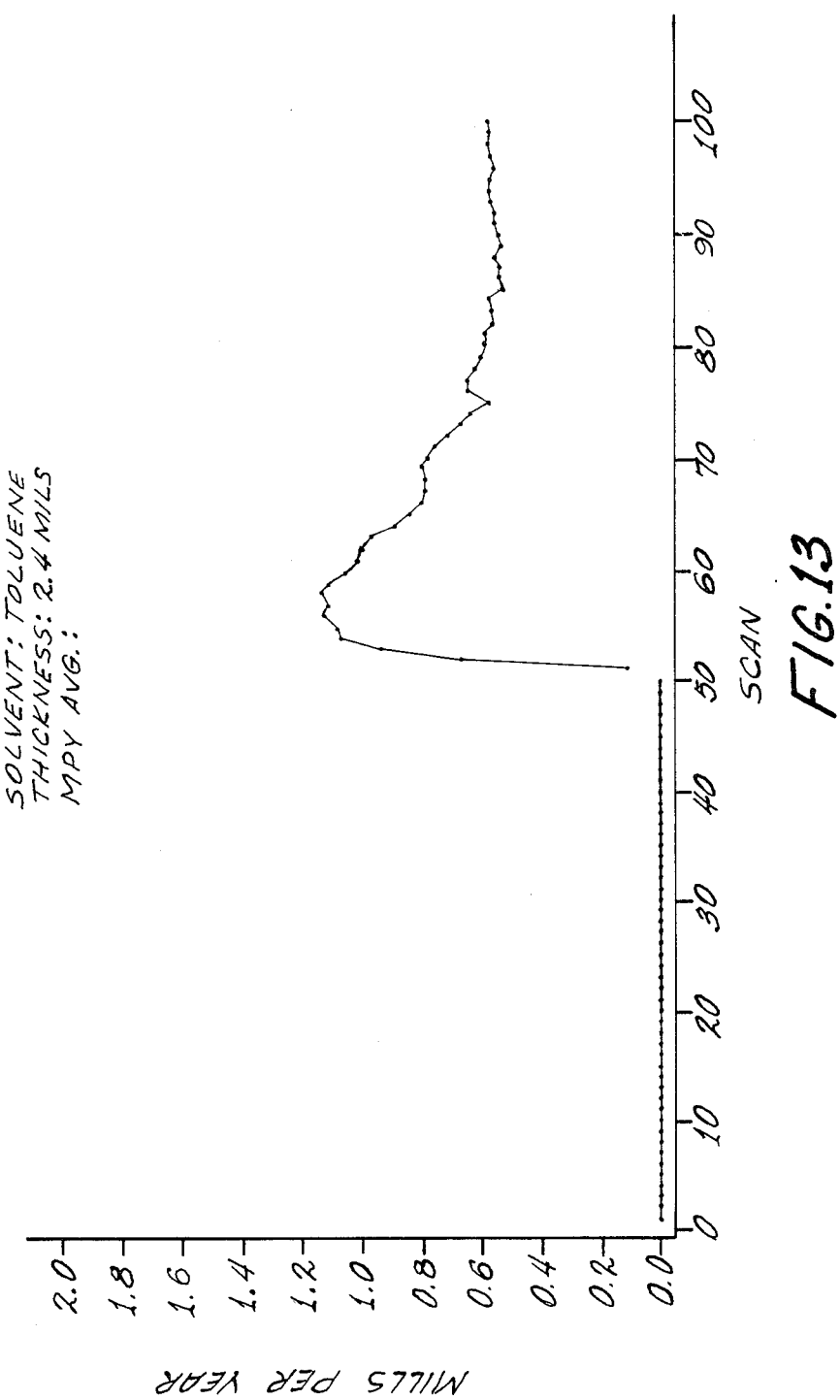
Figure 14:
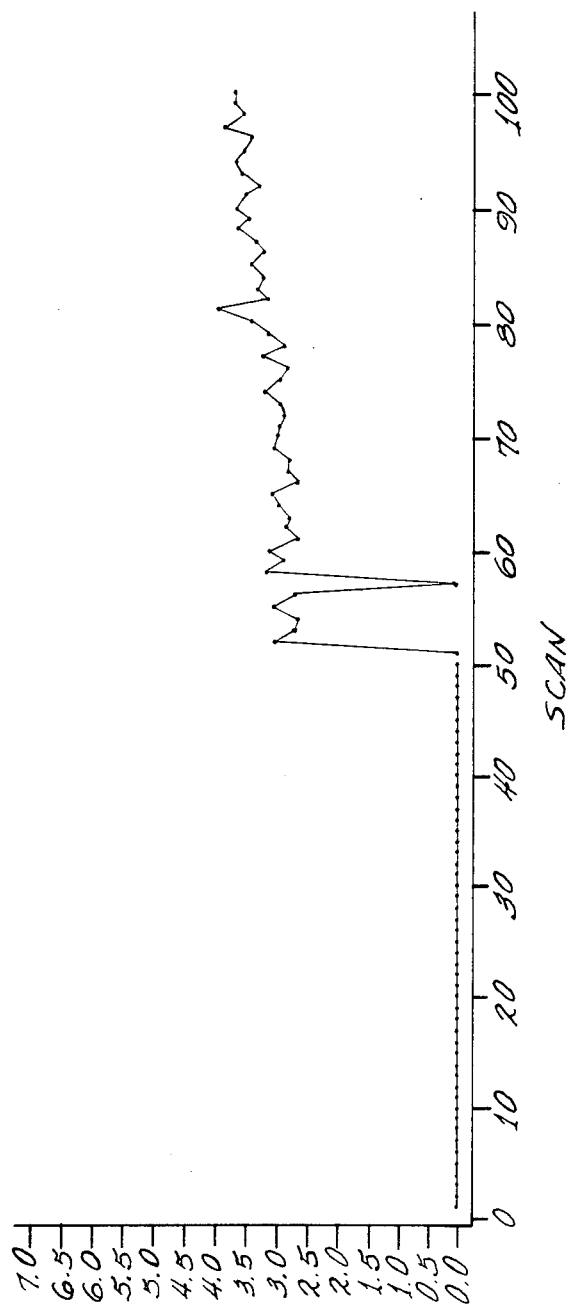

FIG. 10 illustrates the corrosion-resistant properties of spherically symmetric trimethyl phosphite as the convertant. FIGS. 11–14 show generally similar results. The Monar-trimethyl phosphite-tetralin combination of FIG. 12 tested well in subsequent salt spray tests (see Example V, Sample 8 hereof), even though FIG. 12 does not show desirable properties.

Figure 15:
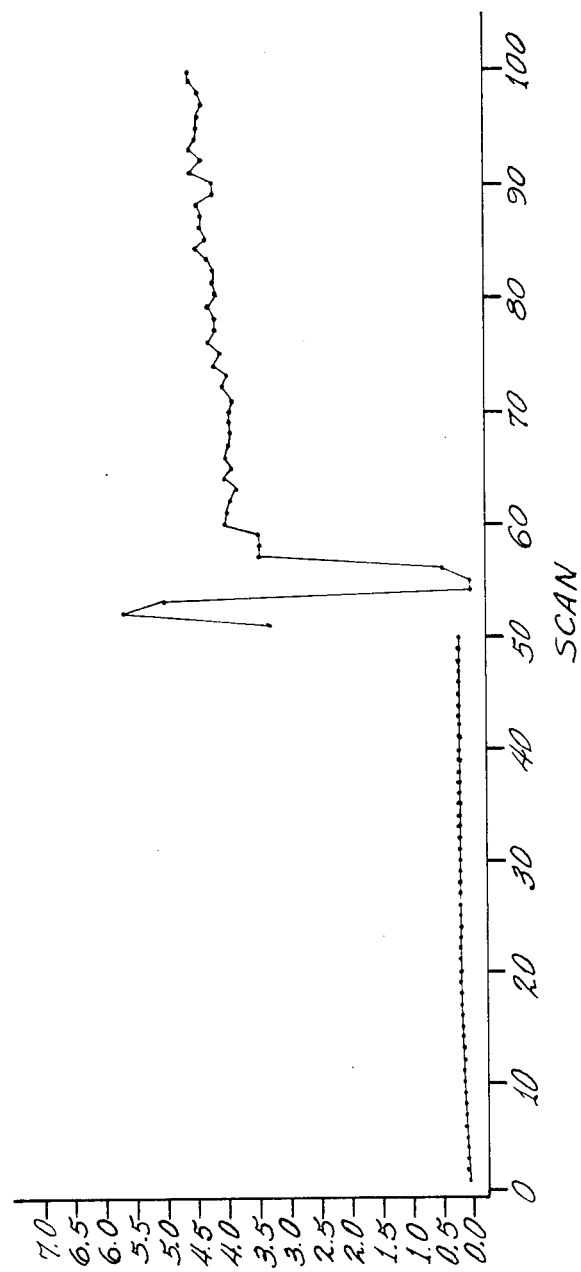
Figure 16:
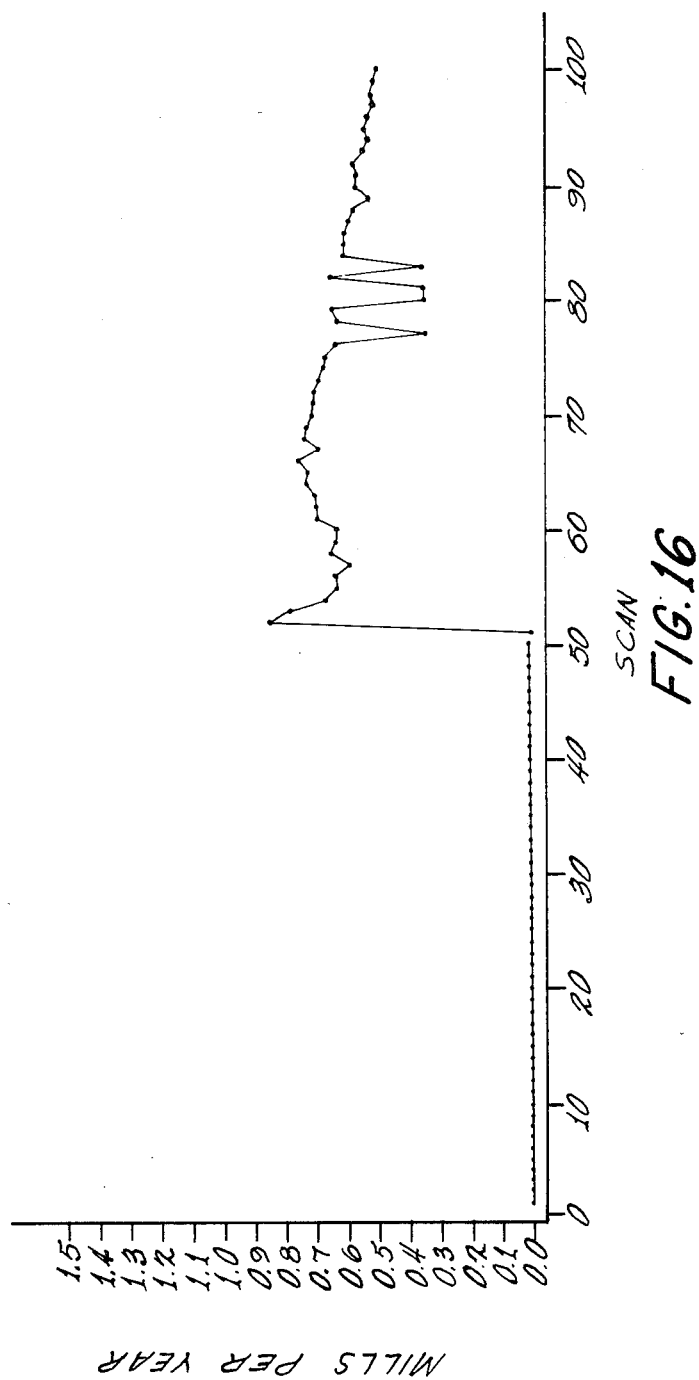

FIG. 15 and FIG. 16 are examples of other spherically symmetric esters, namely trimethyl borate and tetramethyl orthosilicate, respectively.

Figure 17:
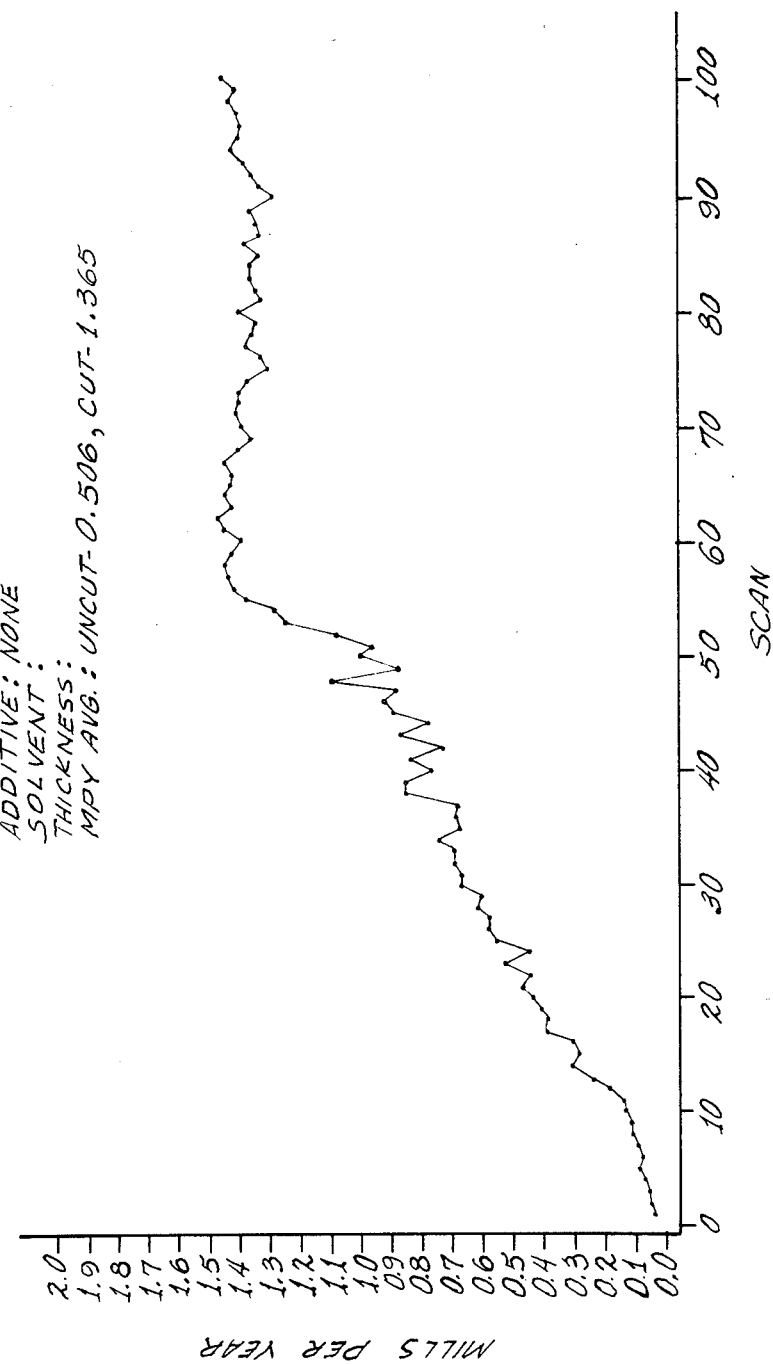
Figure 18:
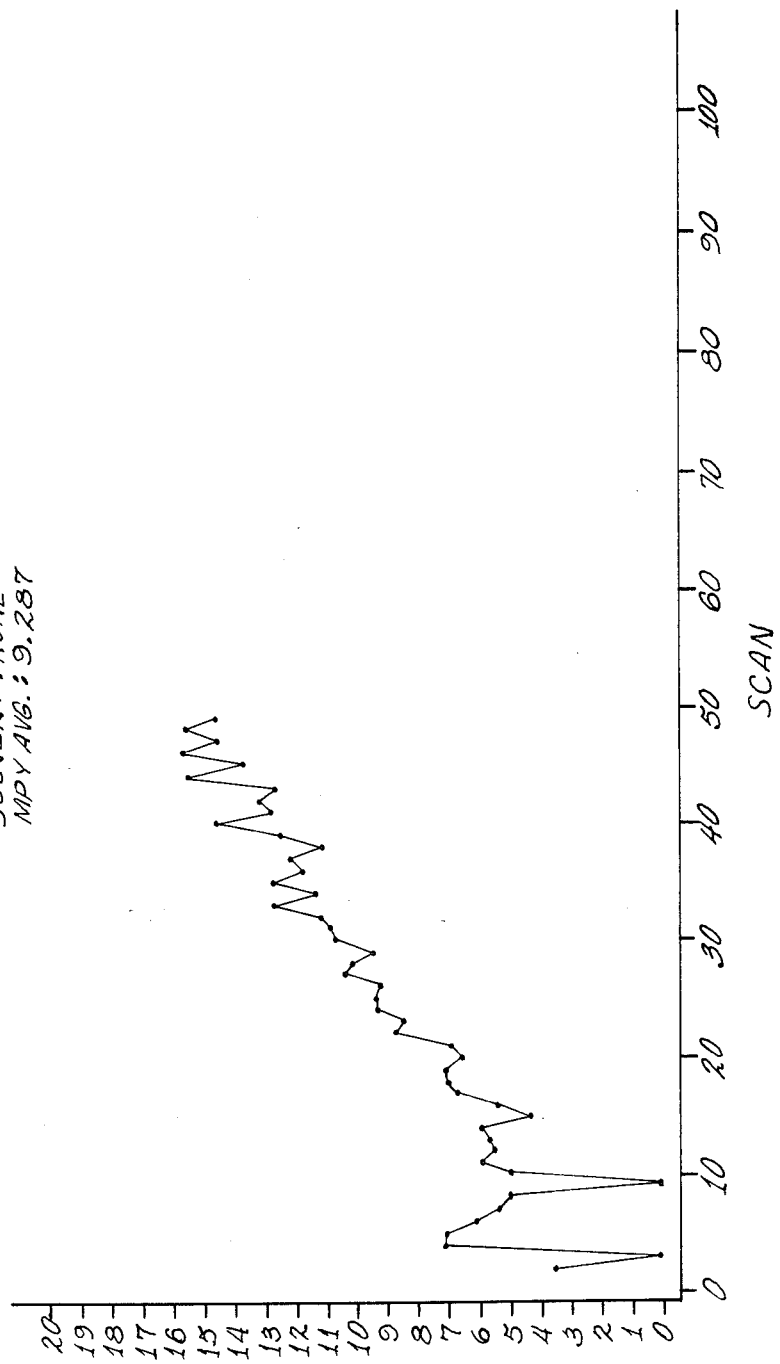
FIGS. 18–20 are charts similar to FIGS. 1–17 of bare, uncoated steel panels.
Figure 19:
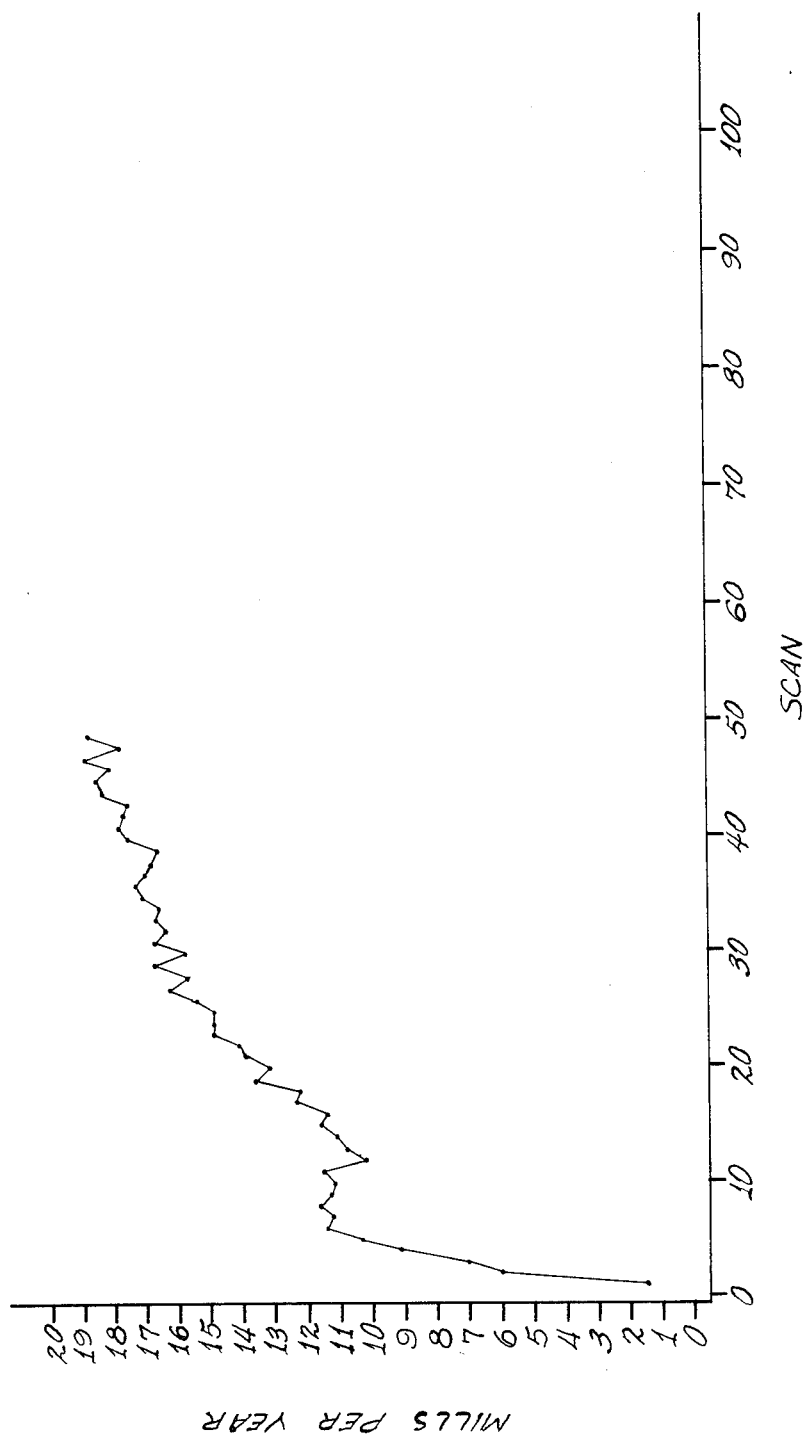
Figure 20:
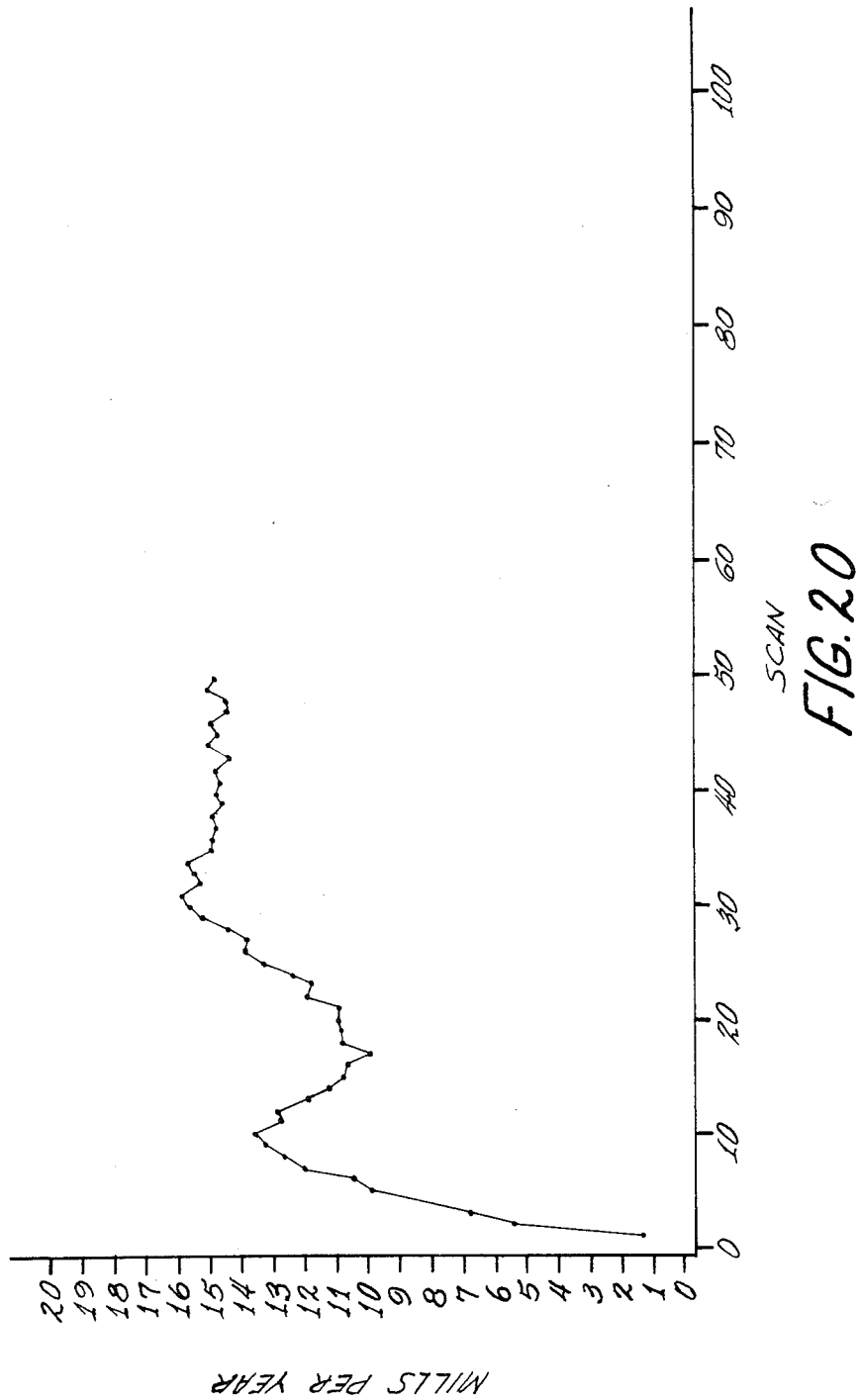

The triethyl phosphate of FIG. 17 is not included as a convertant of the present invention, since it is not a spherically symmetric ester.

This method of determining the corrosion rate is merely indicative of the effectiveness of the corrosion-resistant coating, since (1) the plotted results are subject to the limitations of the testing apparatus and (2) such test results do not precisely correlate with corrosion rates as determined by salt fog testing and actual field trials. It is believed that the method of testing described above and resulting in the plots of FIGS. 1–17 generally is capable of serving as an effective screening device to determine the general corrosion-inhibiting or corrosion-resisting characteristics of the various convertants incorporated into the corrosion-resistant coatings.

However, such testing must be supplemented by actual field trials, as well as salt fog testing, in order to determine the ultimate effectiveness of the various compositions.

EXAMPLE II

A coating suitable for use as an automobile undercoating has the following composition:

| Ingredient | Parts by Weight | % by Weight |
|---|---|---|
| Monar Asphalt | 53.875 | 21.55 |
| Borcke 3150 Resin | 53.875 | 21.55 |
| Morpholine | 17.25 | 6.9 |
| B-66 Acryloid Resin | 8.75 | 3.5 |
| n-Butyl Acetate | 108.75 | 43.5 |
| Diethylene Glycol Methyl Ether | 5.0 | 2.0 |

The coating composition was prepared by adding the Borcke resin to the molten Monar asphalt, then adding the n-butyl acetate, then the B-66 resin. The morpholine was then added with the ethylene glycol ether.

Four hundred parts by weight of the coating composition was then mixed with 34 parts by weight kaolin clay (flat "D" type) with the aid of a high shear mixer, and the final solution was applied to a ferrous substrate by spraying to form a coating having a thickness of from about 6 mils to about 10 mils.

The viscosity of the composition prior to the clay addition was 200 cps using a No. 5 spindle at both 20 r.p.m. and 100 r.p.m. After the clay addition, the viscosity was 980 cps at 20 r.p.m. and 2640 cps at 100 r.p.m.

EXAMPLE IIa 2.5 parts by weight Finaprene 1205 S-B-S block copolymer and an equal amount of toluene was added to the initial batch ingredients of the composition of Example II and the modified batch was blended as explained above, followed by the same clay addition. The composition contained 1% block copolymer.

EXAMPLE IIb

The Finaprene 1205 elastomer of Example IIa was replaced with the same amount by weight of polyisobutylene.

EXAMPLE IIc

The Finaprene 1205 elastomer of Example IIa was replaced with the same amount of Finaprene 416 S-B-S block copolymer.

EXAMPLE IId

This composition is the same as that of Example II, but the diethylene glycol methyl ether content was replaced with the same amount of propylene glycol methyl ether.

EXAMPLE IIe

The composition is that of Example IId, but with the addition of 2.5 parts by weight polyisobutylene and an equal amount of toluene blended into the initial batch, followed by the same clay addition.

EXAMPLE IIf

The 2.5% polyisobutylene of Example IIe was replaced with 2.5 parts by weight Finaprene 1205 S-B-S block copolymer.

The above compositions were coated at a thickness of 1.8 to 3 mils on 20 gauge 1020 steel panels, 4" by 12" and allowed to dry under ambient conditions for 7 days.

Each panel was conditioned in a cold chamber at −20° F for 1 hour, removed and promptly bent about a ¼-inch mandrel. The following results were obtained:

| Example No. | Flex Test |
|---|---|
| II | Large flakes raised from panel |
| IIa | No cracks |
| IIb | Slight cracking |
| IId | Slight cracking |
| IIe | No cracks |
| IIf | No cracks |

The samples were tested for sag by placing them in an oven for 1 hour and then 5 more hours at 275° F. None of the sample coating either sagged or dripped.

EXAMPLE III

Six sample coupons were prepared, as follows:
1. Sample 1 was a 10 mm×5 mm steel coupon ultrasonically cleaned in a xylene bath for three days and air-dried under ambient conditions.
2. Sample 2 was a coupon identical to Sample 1, but sputter-cleaned with argon ions.
3. Sample 3 was a coupon similar to Sample 1, but coated with concentrated morpholine by dipping the coupon into morpholine liquid, then air-dried.
4. Sample 4 was a coupon similar to Sample 1, but coated by dipping it into a 1% solution of morpholine in xylene and then air-dried.
5. Sample 5 was a coupon similar to Sample 1, but cut from a steel panel which had been coated with a corrosion-resistant coating of the present invention consisting of Cenex asphalt containing 8% morpholine. The sample was retrieved from the field where it had been exposed to the elements for nine months. The coating was mechanically stripped from the sample, and the steel substrate was chemically cleaned with toluene. After cleaning, the sample was stored for over a year in a box in a laboratory.
6. Sample 6 was a coupon similar to Sample 1, but coated with the coating of Sample 4 without morpholine. Sample 6 had been weathered as Sample 5.

The samples were analyzed using the "Electron Spectroscopy for Chemical Analysis" technique or ESCA. ESCA is a surface analytical technique in which the sample is excited by soft x-ray, specifically Mg k-alpha x-ray, and photoelectrons are produced. The binding energy of the photoelectron provides the elemental and chemical state identifications, and the intensity of the ESCA electron peak gives the quantitative information. The technique is surface in nature, having a penetration of only 50–100 Angstroms. Each experiment was run in duplicate. The estimate accuracy for the values is +10%, and the estimated precision is +2%.

The following results were obtained:

TABLE 1

| Samples | Surface Chemistry (Wt. %) | | | | | | | |
|---|---|---|---|---|---|---|---|---|
| | O | N | C | Fe | Na | Ca | Cl | Si |
| 1 Steel coupon (ultrasonically cleaned in xylene) | 36.2 | 0.0 | 57.2 | 6.7 | 0.0 | 0.0 | 0.0 | 0.0 |
| 2 Steel coupon (Ar ion sputter cleaned) | 54.3 | 0.0 | 20.2 | 25.5 | 0.0 | 0.0 | 0.0 | 0.0 |
| 3 Conc. morpholine coated steel coupon | 22.2 | 16.3 | 61.6 | 0.0 | 0.0 | 0.0 | 0.0 | 0.0 |
| 4 1% morpholine coated steel coupon | 37.9 | 5.3 | 49.2 | 7.6 | 0.0 | 0.0 | 0.0 | 0.0 |
| 5 Weathered and CRC* stripped steel coupon | 22.2 | 1.6 | 68.4 | 2.0 | 0.6 | 1.5 | 0.9 | 2.8 |
| 6 CRC (without morpholine) stripped steel coupon | 10.3 | 1.1 | 81.0 | 7.5 | 0.0 | 0.0 | 0.0 | 0.0 |

*CRC means the corrosion-resistant coating of this invention.

It is apparent that ultrasonic cleaning in a xylene bath left a heavy layer of hydrocarbon, most likely xylene, on the steel surface of Sample 1. The surface was partially cleaned via Argon ion sputtering in Sample 2. The morpholine layer of the concentrated morpholine coated sample Sample 3 was thick enough that the steel substrate was not detected. This was important for determining the chemical state of pure morpholine, since the ESCA signals so detected should come only from the morpholine coating itself. On the other hand, the 1% morpholine coated Sample 4 produced a very thin surface layer and, hence, the steel substrate was also detected. This Sample 4 was purposely prepared in this way so that the morpholine/steel interface could be analyzed.

The detection of nitrogen from the surface of the weathered Sample 5 indicates the possible existence of morpholine on the sample surface. Results of CRC (without morpholine) stripped Sample 6 confirmed that nitrogen detected on the weathered sample surface was from morpholine.

This and the chemical interaction between the morpholine and the steel substrate were later confirmed via high resolution ESCA analyses. The detection of Na, Ca, Cl, and Si on the surface of the weathered sample was likely due to surface contamination. The nitrogen signal detected from the surface of the no morpholine and stripped Sample 6 indicated the existence of surface asphalt residue, and the asphalt did contain nitrogen containing materials. The difference between this nitrogen and the nitrogen from morpholine was determined through high resolution ESCA analyses.

The binding energy of Samples 3, 4, 5 and 6 was determined by high resolution analysis in the N(ls) region. The estimated precision for the reported values is +0.2 eV.

The following results were obtained:

TABLE 2

| ESCA High Resolution Analysis in the N(1s) Region | |
|---|---|
| Sample | Binding Energy (eV) |
| 3 Concentrated morpholine coated | 399.1 (100%) |

TABLE 2-continued

| ESCA High Resolution Analysis in the N(1s) Region | | |
|---|---|---|
| Sample | Binding Energy (eV) | |
| steel coupon | | |
| 4 | 400.0 | 398.7 |
| 1% morpholine coated steel coupon | (64%) | (36%) |
| 5 | 400.1 | 398.6 |
| Weathered and CRC stripped steel coupon | (66%) | (34%) |
| 6 | | 399.3 |
| CRC (no morpholine) stripped steel coupon | | (100%) |

One nitrogen peak was detected from the concentrated morpholine coated Sample 3, and two nitrogen peaks were detected from the 1% morpholine coated Sample 4 and from the weathered Sample 5. The low binding energy peak (about 398.8 eV) was from a neutral nitrogen; whereas the high binding energy peak (about 400.0 eV) was from a slightly charged nitrogen. Such charges usually result from some sort of reaction at the nitrogen site. For the case of the concentrate morpholine coated Sample 3, no such reaction occurred. For the case of the 1% morpholine coated Sample 4 or the weathered Sample 5, the reaction took place between the morpholine and the steel surface, i.e., a morpholine/steel interfacial reaction. The ESCA results of the weathered Sample 5 also indicate that the interaction between the morpholine and the steel was strong enough to survive a long weathering test and the subsequent mechanical and chemical strippings.

The data also shows that nitrogen in the asphalt did not interfere with the analysis of the morpholine/steel interaction.

EXAMPLE IV

A corrosion-resistant coating of the present invention was prepared and tested against various known compositions. Sample 1 contained 76% Monar asphalt, 10% blown asphalt, 8% morpholine, 8% methyl/butyl methacrylate copolymer (all by weight) in cyclohexanone as a solvent at a solids content of 49%. The tested Smples 1–8 are set forth in Table A as follows:

TABLE A

| Sample No. | Description |
|---|---|
| 1 | Corrosion-resistant coatings (CRC) of this invention |
| 2 | Red lead/oil primer |
| 3 | Zinc chromate-based alkyd |
| 4 | Inorganic zinc-rich primer |
| 5 | Organic zinc-rich primer |
| 6 | Aluminized epoxy mastic |
| 7 | Coal tar mastic |

TABLE A-continued

| Sample No. | Description |
|---|---|
| 8 | Competitive alkyd shop primer |

These Samples 1–8 were prepared and tested by an independent testing laboratory, as follows:

Sample Preparation and Testing

Each coating was applied by air spray in two coats for a total dry film thickness of approximately 4 mils to the following substrates:
(a) wire brushed and cleaned rusty steel (SSPC-SP-2);
(b) commercially-blasted steel (SSPC-SP-6);
(c) near-white blasted steel (SSPC-SP-10).

The samples were allowed to cure at room conditions (one week for each coat), after which film thicknesses and crosshatch adhesions (according to ASTM D-3359) were checked and recorded. Crosshatch adhesion was measured on a scale from 0 (all the paint is lifted off the substrate by the removal of the applied tape) to 5 (none of the paint is lifted off the substrate by the removal of the applied tape). The panels were then labeled, backed, scribed, and salt-fog tested according to ASTM B-117. All samples were made and tested in duplicate in separate cabinets to enhance the reliability of the data (i.e., to minimize the effects of the inevitable scatter associated with the test). Evaluations were performed after approximately 500 hours of exposure and after 1000 hours, after which the test was terminated. Testing was terminated earlier than had been scheduled but after 1000 hours enough result spread was apparent to give authority for discontinuation.

Upon completion of the testing, performance comparisons were made in which salt fog resistance was measured on a scale from 0 (worst) to 10 (best) for corrosion (scribe and general panel attack) and blistering. A rating of -0- for the size of blisters and degree of large blisters (size) or very many blisters (degree), and -9- represents pinpoint blisters (size)—very sparsely distributed (degree). A rating of -10- would indicate no blisters present.

Findings:

The results of the tests are listed in Tables 1 through 8. Tables 1 through 3 show the results of panels of each primer from both sets at the end of 500–600 hours salt fog exposure on rusty, commercially-blasted, and near-white blasted steel, respectively. Table 4 lists the overall average or Tables 1 through 3. Tables 5 through 8 are arranged in a similar fashion as the results of 1000 hours of salt fog exposure. Film thicknesses for the dried primers ranged from 3½ mils to 4½ mils. Crosshatch adhesion values for each of the primer substrates accompany the salt fog test results in the Tables.

TABLE 1

| | Salt Fog Resistance on Rusty Steel After (a) 640 (1st Set) and (b) 540 (2nd Set) Hours of Exposure | | | | | | | | | |
|---|---|---|---|---|---|---|---|---|---|---|
| Coating | Gen. Cor. | | Scr. Cor. | | Blis. Deg. | | Blis. Size | | | Adhesion |
| Sample | (a) | (b) | (a) | (b) | (a) | (b) | (a) | (b) | Avg. | Value |
| 1 | 8.0 | 8.5 | 8.5 | 8.0 | 10.0 | 7.0 | 10.0 | 10.0 | 8.8 | 4 |
| 2 | 9.5 | 8.5 | 8.5 | 9.5 | 3.0 | 4.0 | 9.0 | 9.0 | 7.6 | 5 |
| 3 | 10.0 | 7.0 | 7.5 | 7.5 | 7.0 | 10.0 | 9.0 | 10.0 | 8.5 | 3 |
| 4 | 8.0 | 9.0 | 9.5 | 9.0 | 5.0 | 5.0 | 2.0 | 4.0 | 6.5 | 0 |
| 5 | 8.5 | 8.5 | 9.5 | 10.0 | 5.0 | 3.0 | 2.0 | 4.0 | 6.3 | 4 |
| 6 | 8.0 | 7.0 | 8.0 | 7.0 | 5.0 | 5.0 | 8.0 | 9.0 | 7.1 | 5 |
| 7 | 7.5 | 7.5 | 9.0 | 8.5 | 5.0 | 10.0 | 5.0 | 10.0 | 7.9 | 3 |
| 8 | 8.5 | 9.0 | 8.0 | 8.0 | 8.0 | 10.0 | 9.0 | 10.0 | 8.8 | 5 |

TABLE 2

Salt Fog Resistance on Commercially Blasted Steel After (a) 640 (1st Set) and (b) 540 (2nd Set) Hours of Exposure

| Coating Sample | Gen. Cor. (a) | Gen. Cor. (b) | Scr. Cor. (a) | Scr. Cor. (b) | Blis. Deg. (a) | Blis. Deg. (b) | Blis. Size (a) | Blis. Size (b) | Avg. | Adhesion Value |
|---|---|---|---|---|---|---|---|---|---|---|
| 1 | 7.0 | 7.0 | 8.0 | 7.5 | 10.0 | 10.0 | 10.0 | 10.0 | 8.7 | 3 |
| 2 | 9.5 | 9.0 | 8.0 | 6.0 | 6.0 | 10.0 | 9.0 | 10.0 | 8.5 | 5 |
| 3 | 10.0 | 6.5 | 8.5 | 7.5 | 10.0 | 10.0 | 10.0 | 10.0 | 9.1 | 3 |
| 4 | 8.0 | 9.0 | 10.0 | 10.0 | 5.0 | 5.0 | 2.0 | 4.0 | 6.6 | 0 |
| 5 | 8.5 | 9.0 | 9.5 | 10.0 | 10.0 | 8.0 | 10.0 | 2.0 | 8.4 | 5 |
| 6 | 9.0 | 5.0 | 8.0 | 7.0 | 5.0 | 5.0 | 5.0 | 7.0 | 6.4 | 5 |
| 7 | 7.5 | 8.5 | 8.0 | 8.0 | 6.0 | 10.0 | 6.0 | 10.0 | 8.0 | 5 |
| 8 | 9.0 | 8.5 | 8.0 | 7.5 | 10.0 | 2.0 | 10.0 | 2.0 | 7.2 | 5 |

TABLE 3

Salt Fog Resistance on Near-White Blasted Steel After (a) 640 (1st Set) and (b) 540 (2nd Set) Hours of Exposure

| Coating Sample | Gen. Cor. (a) | Gen. Cor. (b) | Scr. Cor. (a) | Scr. Cor. (b) | Blis. Deg. (a) | Blis. Deg. (b) | Blis. Size (a) | Blis. Size (b) | Avg. | Adhesion Value |
|---|---|---|---|---|---|---|---|---|---|---|
| 1 | 8.5 | 8.5 | 8.0 | 8.0 | 10.0 | 10.0 | 10.0 | 10.0 | 9.1 | 4 |
| 2 | 9.5 | 8.5 | 8.0 | 8.0 | 10.0 | 10.0 | 10.0 | 10.0 | 9.3 | 5 |
| 3 | 9.0 | 9.0 | 8.0 | 9.0 | 10.0 | 10.0 | 10.0 | 10.0 | 9.4 | 4 |
| 4 | 0.0 | 6.0 | 0.0 | 9.5 | 0.0 | 8.0 | 0.0 | 8.0 | 3.8 | 0 |
| 5 | 8.5 | 9.0 | 9.5 | 10.0 | 10.0 | 8.0 | 10.0 | 2.0 | 8.4 | 5 |
| 6 | 7.5 | 7.5 | 8.0 | 7.0 | 5.0 | 10.0 | 7.0 | 10.0 | 7.8 | 5 |
| 7 | 7.5 | 7.5 | 8.0 | 7.0 | 5.0 | 10.0 | 7.0 | 10.0 | 7.8 | 5 |
| 8 | 9.0 | 9.0 | 8.0 | 9.0 | 10.0 | 2.0 | 10.0 | 2.0 | 7.4 | 5 |

TABLE 4

Average Salt Fog Resistance on All Substrates at the End of the First Exposure Period. Salt Fog Hours Have Been Averaged at 590 Hours

| Coating Sample | Gen. Cor. | Scr. Cor. | Blis. Deg. | Blis. Size | Avg. | Adhesion Value |
|---|---|---|---|---|---|---|
| 1 | 7.9 | 8.0 | 9.5 | 10.0 | 8.9 | 3.7 |
| 2 | 9.1 | 8.0 | 7.2 | 9.5 | 8.5 | 5.0 |
| 3 | 8.6 | 8.0 | 9.5 | 9.8 | 9.0 | 3.3 |
| 4 | 6.7 | 7.9 | 4.7 | 3.3 | 5.6 | 0 |
| 5 | 8.7 | 9.8 | 7.3 | 5.0 | 7.7 | 4.7 |
| 6 | 7.3 | 7.7 | 5.0 | 6.8 | 6.7 | 5.0 |
| 7 | 7.7 | 8.1 | 7.7 | 8.0 | 7.9 | 4.3 |
| 8 | 8.9 | 8.1 | 7.0 | 7.2 | 7.8 | 5.0 |
| Average | 8.1 | 8.2 | 7.2 | 7.5 | 7.8 | 3.9 |

TABLE 5

Salt Fog Resistance on Rusty Steel After (a) 1046 (1st Set) and (b) 1017 (2nd Set) Hours of Exposure

| Coating Sample | Gen. Cor. (a) | Gen. Cor. (b) | Scr. Cor. (a) | Scr. Cor. (b) | Blis. Deg. (a) | Blis. Deg. (b) | Blis. Size (a) | Blis. Size (b) | Avg. | Adhesion Value |
|---|---|---|---|---|---|---|---|---|---|---|
| 1 | 5.0 | 7.5 | 7.0 | 7.0 | 10.0 | 4.0 | 10.0 | 9.0 | 7.5 | 4 |
| 2 | 9.0 | 8.0 | 5.0 | 7.0 | 3.0 | 4.0 | 7.0 | 7.0 | 6.3 | 5 |
| 3 | 10.0 | 7.0 | 5.0 | 5.0 | 7.0 | 10.0 | 9.0 | 10.0 | 7.9 | 3 |
| 4 | 7.0 | 4.0 | 9.0 | 9.0 | 5.0 | 5.0 | 2.0 | 4.0 | 5.6 | 0 |
| 5 | 4.0 | 4.0 | 8.0 | 10.0 | 5.0 | 3.0 | 2.0 | 4.0 | 5.0 | 4 |
| 6 | 6.0 | 6.0 | 6.0 | 6.0 | 2.0 | 5.0 | 8.0 | 7.0 | 5.8 | 5 |
| 7 | 3.0 | 7.0 | 9.0 | 8.0 | 4.0 | 10.0 | 4.0 | 10.0 | 6.9 | 3 |
| 8 | 8.0 | 8.0 | 4.0 | 5.0 | 5.0 | 10.0 | 8.0 | 10.0 | 7.3 | 5 |

TABLE 6

Salt Fog Resistance on Commercially Blasted Steel After (a) 1046 (1st Set) and (b) 1017 (2nd Set) Hours of Exposure

| Coating Sample | Gen. Cor. (a) | Gen. Cor. (b) | Scr. Cor. (a) | Scr. Cor. (b) | Blis. Deg. (a) | Blis. Deg. (b) | Blis. Size (a) | Blis. Size (b) | Avg. | Adhesion Value |
|---|---|---|---|---|---|---|---|---|---|---|
| 1 | 3.0 | 6.0 | 7.0 | 7.0 | 10.0 | 10.0 | 10.0 | 10.0 | 7.9 | 3 |
| 2 | 8.0 | 7.0 | 1.0 | 0.0 | 6.0 | 10.0 | 8.0 | 10.0 | 6.3 | 5 |
| 3 | 10.0 | 3.0 | 8.0 | 5.0 | 10.0 | 10.0 | 10.0 | 10.0 | 8.3 | 3 |
| 4 | 8.0 | 4.0 | 10.0 | 10.0 | 5.0 | 5.0 | 2.0 | 4.0 | 6.0 | 0 |
| 5 | 7.0 | 3.0 | 9.0 | 9.0 | 10.0 | 8.0 | 10.0 | 2.0 | 7.3 | 5 |
| 6 | 7.0 | 4.0 | 8.0 | 6.0 | 3.0 | 5.0 | 3.0 | 7.0 | 5.4 | 5 |
| 7 | 2.0 | 7.0 | 7.0 | 8.0 | 5.0 | 7.0 | 5.0 | 6.0 | 5.9 | 5 |
| 8 | 9.0 | 2.0 | 5.0 | 2.0 | 5.0 | 2.0 | 1.0 | 2.0 | 3.5 | 5 |

TABLE 7

Salt Fog Resistance on Near-White Blasted Steel After (a) 1046 (1st Set) and (b) 1017 (2nd Set) Hours of Exposure

| Coating Sample | Gen. Cor. (a) | Gen. Cor. (b) | Scr. Cor. (a) | Scr. Cor. (b) | Blis. Deg. (a) | Blis. Deg. (b) | Blis. Size (a) | Blis. Size (b) | Avg. | Adhesion Value |
|---|---|---|---|---|---|---|---|---|---|---|
| 1 | 4.0 | 6.0 | 6.0 | 7.0 | 10.0 | 10.0 | 10.0 | 10.0 | 7.9 | 4 |
| 2 | 8.0 | 8.0 | 0.0 | 1.0 | 10.0 | 10.0 | 10.0 | 10.0 | 7.1 | 5 |
| 3 | 7.0 | 7.0 | 8.0 | 8.0 | 10.0 | 10.0 | 10.0 | 10.0 | 8.8 | 4 |
| 4 | 0.0 | 6.0 | 0.0 | 9.0 | 0.0 | 8.0 | 0.0 | 8.0 | 3.9 | 0 |
| 5 | 7.0 | 4.0 | 9.0 | 10.0 | 10.0 | 8.0 | 10.0 | 2.0 | 7.5 | 5 |
| 6 | 2.0 | 7.0 | 7.0 | 6.0 | 2.0 | 5.0 | 2.0 | 5.0 | 4.5 | 5 |
| 7 | 2.0 | 7.0 | 7.0 | 7.0 | 5.0 | 9.0 | 5.0 | 6.0 | 6.0 | 5 |
| 8 | 9.0 | 2.0 | 5.0 | 9.0 | 5.0 | 2.0 | 1.0 | 2.0 | 4.4 | 5 |

TABLE 8

Average Salt Fog Resistance on All Substrates
Salt Fog has been Averaged at 1032 Hours

| Coating Sample | Gen. Cor. | Scr. Cor. | Blis. Deg. | Blis. Size | Avg. | Adhesion Value |
|---|---|---|---|---|---|---|
| 1 | 5.3 | 6.8 | 9.0 | 9.8 | 7.7 | 3.7 |
| 2 | 8.0 | 2.3 | 7.2 | 8.7 | 6.6 | 5.0 |
| 3 | 7.3 | 6.5 | 9.5 | 9.8 | 8.3 | 3.3 |
| 4 | 4.8 | 7.8 | 4.7 | 3.3 | 5.2 | 0 |
| 5 | 4.8 | 9.2 | 7.3 | 5.0 | 6.6 | 4.7 |
| 6 | 5.3 | 6.5 | 3.7 | 5.3 | 5.0 | 5.0 |
| 7 | 4.7 | 7.7 | 6.7 | 6.0 | 6.3 | 4.3 |
| 8 | 6.2 | 5.0 | 4.8 | 4.0 | 5.0 | 5.0 |
| Average | 5.8 | 6.5 | 6.6 | 6.5 | 6.4 | 3.9 |

Data quality from the above tests is in many instances surprising, and in some cases clearly anomalous. In other cases, it clearly reflects the basic variability of the salt fog tests and the susceptibility of certain topcoating types to problematic degenerative responses to the test environment (e.g., the cathodic alkaline induced saponification of the red lead/oil primers of Sample 2 around the scribe). The different sensitivities of the two cabinets are also clearly evident.

Data from the two zinc-rich systems of Samples 4 and 5 are misleadingly poor over the two better surfaces. This is particularly true of the inorganic zinc which seems to have been related to a defective sample. Large film sections of this product delaminated from the blasted panels in test, exposing the bare steel to the corrosive environment. In separate evaluations the same product has been shown to be a defective batch. In the experience of this laboratory, inorganic zinc-rich coatings exposed to salt fog for 1000 hours show almost perfect panel condition (aside from the inevitable development of zinc corrosion product). The poor performance of the organic zinc-rich primer (Sample 5) in this test is less easily explained, although this material should not be as good in salt fog as the inorganic under normal circumstances.

While at first sight the aluminized epoxy mastics of Sample 6 might seem surprisingly disappointing, their relatively poor showing is almost certainly related to the film thicknesses used in this test which are considerably below those film thicknesses normally required for good performance from this type of product. Aluminized epoxy mastics must normally be applied at between 8-12 mils (instead of 3.5 to 4.0 mils) in order to achieve their customary performance profile.

Upon review of the findings, it is apparent that the coating of Sample 1 has considerable potential as a protective coating for both rusted and non-rusted steel surfaces, although some of the data from the above program is surprising and probably anomalous. In comparison to a full range of typical primer systems, the Sample 1 product gave good overall salt fog performance on all substrate conditions despite a severe surface cratering which occurred after initiation of testing on all substrates. The blistering resistance of all Sample 1 films was exceptional and remained virtually unchanged from 500-1000 hours exposure unlike that of many of the other controls which slowly deteriorated.

On the negative side, the Sample 1 coating's general corrosion resistance was somewhat below average for the group by the end of the test, corrosion resistance values for this product seeming to drop off rapidly during the latter half of the test. This was perhaps related to the odd cratered surface appearance of the Sample 1 coating primer. The exact nature of the cratering and its causes remains unknown. The phemomena may have been related to stress effects from curing (surface curing at a different rate to the underfilm), or it may have been related to solvent entrapment or perhaps other causes. Solvent entrapment is not at all unreasonable in view of the exceptionally slow solvent system (cyclohexanone) noted in the product during application. It is probable that residues of cyclohexanone remained in the film long after apparent drying, and these were then driven through the cured surface of the film by the temperature of the exposure cabinet. Cyclohexanone will take up as much as 8% water which may subsequently affect the solubility characteristics of the solvent or become entrapped with the coating.

Whatever the cause of the cratering problem, film disruption of this type, if nothing else, would tend to reduce the effective film thickness of the coating and may lead to perforations in the film, both inevitably reducing corrosion resistance.

While adhesion was found to be good, there was room for further improvement. Again, however, the incompleteness of cure may have played no small part in the slightly reduced adhesion values.

While the Sample 1 coating generally shows promise as a protective coating for steel, it is felt that its general panel corrosion resistance needs some improvement. As the scribe corrosion resistance is substantially better than the general panel corrosion resistance, it is conjected that film disruption related to the surface cratering may have played no small part in these reduced values. Blistering resistance of the Sample 1 films on all substrates was excellent, and this is particularly surprising and encouraging on the rusted surfaces, where blistering related to ionic contamination is usually problematic. While the overall performance level of the Sample 1 is therefore encouraging, the cratering deficiency seen in all films requires considerable attention. It is the opinion of this laboratory that this cratering deficiency not only detracts from the aesthetics of the film but almost certainly produces a lower corrosion resistance profile than might otherwise have been achieved. It is felt that attention to the cure kinetics and the rate of solvent release may well improve these properties.

EXAMPLE V

Thirty-eight samples were subjected to salt spray testing for 540 hours in accordance with ASM B-117, generally as reported in Example IV. These samples were not scribed or cut.

Samples 37 and 38 were 1020 steel blanks used as controls. Samples 33-36 contained no asphalt, and Samples 19-32 were field-tested samples corresponding to samples previously roof-top tested.

Each Sample 1-32 was prepared by spray-coating 20-gauge steel panels, each 4" by 12", with the indicated compositions to a thickness of about 4 mils. Each sample contained about 8% of the indicated convertant and about 8% of the indicated polymer, where present.

The samples were visually observed and rated by two observers (whose ratings then were averaged) in comparison to the two uncoated control Samples 37 and 38, which were arbitrarily rated at 6 to establish a base line. A panel rated at a value of 12 is considered to be twice as well protected as an uncoated steel panel in the salt fog test after 504 actual test hours.

The compositions and their comparative ratings are as follows:

| Sample No. | Convertant | Asphalt | Solvent | Polymer | Rating |
|---|---|---|---|---|---|
| 1 | M | SU 1500 | TOL | — | 16 |
| 2 | M | SU 1500 | TOL | B-66 | 17 |
| 3 | TMP | SU 1500 | TOL | B-72 | 15 |
| 4 | M | MONAR | TOL | — | 22 |
| 5 | M | MONAR | TOL | B-66 | 15 |
| 6 | TMP | MONAR | TOL | B-72 | 19 |
| 7 | M | MONAR | TETR | — | 13 |
| 8 | TMP | MONAR | TETR | — | 19 |
| 9 | M | MONAR | CHN | — | 7 |
| 10 | TMP | MONAR | CHN | — | 7 |
| 11 | M | MONAR | CUMENE | — | — |
| 12 | TMP | MONAR | CUMENE | — | 22 |
| 13 | TMP | MONAR | APN | — | 18 |
| 14 | M | MONAR | APN | — | 10 |
| 15 | TMP | MONAR | BUTYL | — | — |
| 16 | M | MONAR | BUTYL | — | 14 |
| 17 | TMP | MONAR | ETHYL | — | 5 |
| 18 | M | MONAR | ETHYL | — | 5 |
| 19 | M | CENEX | TOL | B-66 | 5 |
| 20 | TMP | CENEX | TOL | B-66 | 5 |
| 21 | M | CENEX | TOL | B-72 | 13 |
| 22 | TMP | CENEX | TOL | B-72 | 13 |
| 23 | M | CENEX | TOL | — | 5 |
| 24 | M | CENEX | TOL | — | 12 |
| 25 | M | CENEX | TOL | — | 7 |
| 26 | M | CENEX | TOL | — | 6 |
| 27 | M | CENEX | TOL | B-66/UV49 | 6 |
| 28 | TMP | CENEX | TOL | B-66/UV49 | 6 |
| 29 | M | CENEX | TOL | B-66/UV49 | 6 |
| 30 | TMP | CENEX | TOL | B-66/UV49 | 6 |
| 31 | — | CENEX | TOL | UV49 | 6 |
| 32 | — | CENEX | TOL | — | 11 |
| 33 | M | — | TOL | B-67 | 14 |
| 34 | TMP | — | TOL | B-67 | 6 |
| 35 | M | — | TOL | B-67 | 11 |
| 36 | TMP | — | TOL | B-67 | 11 |
| 37 | UNCOATED CONTROL | — | — | — | 6 |
| 38 | UNCOATED | — | — | — | 6 |

| Sample No. | Convertant | Asphalt | Solvent | Polymer | Rating |
|---|---|---|---|---|---|
| CONTROL | | | | | |

M = Morpholine
TMP = Trimethyl phosphite
SU 1500 = Atlas propane-washed asphalt
TOL = Toluene
TETR = Tetralin
CHN = Cyclohexanone
APN = Acetophenone
BUTYL = Butyl ether
ETHYL = Ethyl acetone
UV49 = (2,2-hydroxy-5-t-octylphenyl) benzotriazole

EXAMPLE VI

Sixteen samples were prepred in accordance with the following schedule.

The Samples 4-7 and 14, 15 were coated wtih 50 parts by weight propane-washed asphalt (Monar), 50 parts by weight toluene, 8 parts by weight convertant, and 8 parts by weight polymer, where present. The other samples were coated as indicated.

TABLE VIA

| Sample No. | Asphalt | Convertant | Polymer | Other |
|---|---|---|---|---|
| 1 | Control | | | |
| 2 | Cenex | — | — | — |
| 3 | SU 1500 | — | — | — |
| 4 | Monar | M | F-10 | — |
| 5 | Monar | M | B-66 | — |
| 6 | Monar | M | B-72 | — |
| 7 | Monar | M | C-10 | — |
| 8 | Monar | — | — | — |
| 11 | — | — | — | COATING A |
| 12 | — | — | — | COATING B |
| 13 | Monar | — | — | — |
| 14 | Monar | M | — | — |
| 15 | Monar | TMP | — | — |
| 16 | Monar | EDTA | — | — |
| 17 | Monar | — | F-10 | — |
| 18 | Galvanized Steel | — | — | — |

Coating "A" is a water-based resin emulsion containing a synthetic latex resin, an organic acid and propylene glycol in water.

Coating "B" is believed to be a low-viscosity chelating polymer composition as disclosed in U.S. Pat. No. 3,753,924.

The samples were tested in a xenon Weatherometer in accordance with ASTM G-26. The chamber temperature was 145° F.±5° F., the relative humidity was 50±5%, and the cycle was 102 minutes light followed by 18 minutes light plus spray. The spectral irradiance was 0.32 watts/square meter at 340 nanometer wavelength. The samples were scribed before testing.

The specimens were removed from the Weatherometer at increments of 20, 40, 100, 160, 200, 300, 600 and 1,000 hours. 35 mm color photos were taken at each level, and 230×magnification photomicrographs were taken at 600 and 1,000 hour levels to record incremental changes. The photographs were examined for evidence of rusting, cracking, crazing, coating removal and other factors.

The final samples, after 1,000 hours, were graded by the two inventors who graded each sample on a scale of 1 to 15, with 15 being the best, for microscopic scribe corrosion (MSC), for macroscopic appearance (MA), and for protection of chipped areas (PCA). The scores were added for each category and a total was recorded.

The following results were obtained:

TABLE VIB

| Sample No. | MSC | MA | PCA | TOTAL |
|---|---|---|---|---|
| 1 | 13 | 13 | 7 | 33 |
| 2 | 10 | 10 | 14 | 34 |
| 3 | 26 | 19 | 19 | 64 |
| 4 | 20 | 19 | 16 | 55 |
| 5 | 17 | 17 | 17 | 51 |
| 6 | 22 | 25 | 25 | 72 |
| 7 | 25 | 24 | 22 | 71 |
| 8 | 25 | 24 | 25 | 74 |
| 11 | 16 | 16 | 4 | 36 |
| 12 | 4 | 5 | 4 | 13 |
| 13 | 22 | 19 | 19 | 60 |
| 14 | 22 | 16 | 17 | 55 |
| 15 | 29 | 22 | 22 | 73 |
| 16 | 30 | 16 | 22 | 68 |
| 17 | 16 | 10 | 13 | 39 |
| 18 | 25 | 19 | 18 | 60 |

F-10 = Butyl methacrylate polymer (Rohm & Haas)
C-10 = Methylacrylate polymer (Rohm & Haas)
EDTA = Ethylenediaminetetraacetic acid

We claim:

1. A coating on a ferrous surface, comprising:
    (a) from about 1% to about 15% by weight of a convertant selected from the group consisting of morpholine and spherically symmetric alkyl esters of phosphorus, silicon or boron;
    (b) the balance is a matrix adherent to the ferrous surface and compatible with the convertant, and
    (c) the convertant, as determined by ESCA analysis, remains on the ferrous surface after mechanical and solvent removal of the coating.

2. A coating as defined in claim 1, wherein the convertant is morpholine and the matrix includes propane-washed asphalt or a petroleum resin or a mixture thereof and further includes a methyl/butyl methacrylate copolymer.

3. A coating as defined in claim 1, wherein the convertant is trimethyl phosphite and the matrix includes propane washed asphalt or a petroleum resin or a mixture thereof and further includes an ethyl methacrylate copolymer.

4. A coating as defined in claim 1, wherein the matrix consists essentially of asphalt, a petroleum resin, and an acrylic resin.

5. A corrosion-resistant coating applied to an article having a ferrous surface comprising a matrix containing a convertant, the matrix including propane-washed asphalt, the convertant being selected from the group consisting of morpholine absorbed on the ferrous surface and spherically symmetric alkyl esters of phosphorus, baron or silicon chemically reacted with the ferrous surface and the coating resists undercutting and flaking off when the coating is cut to the substrate and the article is subjected to salt fog testing.

6. A corrosion-resistant coating as defined in claim 5 wherein the coating contains from about 1% to about 15% by weight convertant and wherein the coating further includes an acrylic resin.

7. The coating of claim 1 wherein said matrix comprises propane-washed asphalt, a petroleum resin, and a film forming acrylate or methacrylate polymer or copolymer, and wherein said esters of phosphorus are symmetric phosphites.

8. The coating of claim 7 wherein said convertant is morpholine.

9. The coating of claim 1 wherein said convertant is a symmetric phosphite.

10. The coating of claim 9 wherein said phosphite is trimethyl phosphite.

11. The coating of claim 1 wherein sid coating comprises about 6 to about 10% by weight of said convertant.

* * * * *